US012718684B2

(12) United States Patent
Fowe

(10) Patent No.: US 12,718,684 B2
(45) Date of Patent: Aug. 25, 2026

(54) METHOD, APPARATUS, AND SYSTEM FOR VERIFYING A LANE CLOSURE USING PROBE DATA

(71) Applicant: HERE Global B.V., Eindhoven (NL)

(72) Inventor: James Adeyemi Fowe, Evanston, IL (US)

(73) Assignee: HERE Global B.V., Eindhoven (NL)

( * ) Notice: Subject to any disclaimer, the term of this patent is extended or adjusted under 35 U.S.C. 154(b) by 361 days.

(21) Appl. No.: 17/564,907

(22) Filed: Dec. 29, 2021

(65) Prior Publication Data

US 2022/0207993 A1 Jun. 30, 2022

Related U.S. Application Data

(60) Provisional application No. 63/132,658, filed on Dec. 31, 2020.

(51) Int. Cl.
*G08G 1/01* (2006.01)
*G06N 7/01* (2023.01)

(52) U.S. Cl.
CPC ............. *G08G 1/0129* (2013.01); *G06N 7/01* (2023.01)

(58) Field of Classification Search
None
See application file for complete search history.

(56) References Cited

U.S. PATENT DOCUMENTS 9,811,085 B1 * 11/2017 Hayes .................. G08G 1/0112
10,551,847 B2 * 2/2020 Stenneth ............. G05D 1/0238
10,643,462 B2 5/2020 Fowe et al.
10,643,463 B2 5/2020 Thelen et al.
10,943,152 B2 * 3/2021 Averbuch ............... G01S 7/417
(Continued)

FOREIGN PATENT DOCUMENTS

WO WO-2011023306 A1 * 3/2011 ............ G01C 21/26

OTHER PUBLICATIONS

Wang X, Peng L, Chi T, Li M, Yao X, Shao J (2015) A Hidden Markov Model for Urban-Scale Traffic Estimation Using Floating Car Data. PLoS ONE 10(12) (Year: 2015).*
(Continued)

*Primary Examiner* — Rachid Bendidi
*Assistant Examiner* — Kai Wang
(74) *Attorney, Agent, or Firm* — DITTHAVONG, STEINER & MLOTKOWSKI

(57) ABSTRACT

An approach is disclosed for verifying a lane closure using probe data. The approach involves, for example, receiving probe data collected from a probe device traveling a road link. The approach also involves performing a spatial clustering of the probe data with respect to a longitudinal axis of the road link. The approach further involves comparing the spatial clustering of the probe data to a historical spatial clustering of historical probe data of the road link to determine a cluster shift, wherein the cluster shift indicates that a cluster of the spatial clustering has shifted spatially to the left or right relative to at least one other cluster of the historical clustering. The approach also involves detecting a lane closure on the road link based on determining that the cluster shift is greater than a shift distance threshold. The approach further involves providing the detected lane closure as an output.

15 Claims, 19 Drawing Sheets

(56) References Cited

U.S. PATENT DOCUMENTS

| | | | | |
|---|---|---|---|---|
| 2015/0253141 | A1* | 9/2015 | Kesting | G01C 21/30 701/409 |
| 2016/0125734 | A1* | 5/2016 | Stenneth | G08G 1/0112 340/935 |
| 2018/0017396 | A1* | 1/2018 | Lynch | G01C 21/3881 |
| 2018/0158325 | A1* | 6/2018 | Bernhardt | G08G 1/0129 |
| 2019/0325349 | A1* | 10/2019 | Zhang | G06N 3/0464 |
| 2020/0011684 | A1 | 1/2020 | Mcerlain, II et al. | |
| 2020/0090503 | A1* | 3/2020 | Rolf | G08G 1/0116 |
| 2020/0110817 | A1* | 4/2020 | Viswanathan | G06F 16/215 |
| 2020/0394198 | A1* | 12/2020 | Smith | G06F 16/24575 |
| 2021/0142659 | A1* | 5/2021 | Chen | G08G 1/0141 |
| 2022/0081004 | A1* | 3/2022 | Brown | G08G 1/166 |

OTHER PUBLICATIONS

Wang et al., "A Hidden Markov Model for Urban-Scale Traffic Estimation Using Floating Car Data", Research Article, Dec. 28, 2015, pp. 1-20.

* cited by examiner 100
129
111
109
109a
109n
101a-101n
107a-107n
USER EQUIPMENT (UE) 113a-n
APPLICATIONS 115a-n
SERVICES PLATFORM 123
SERVICE 125a
SERVICE 125n
COMMUNICATION NETWORK 105
CONTENT PROVIDER 127a
CONTENT PROVIDER 127m
MAPPING PLATFORM 103
MACHINE LEARNING SYSTEM 121
PROBE DATABASE 117
GEOGRAPHIC DATABASE 119

FIG. 3A 109
305
301
301
301
307a
307b
307c
307d
109a 109b 109c 109d

FIG. 3B 109
305
303
301
301
301
307a
307b
307c
109a 109b 109c 109d 301a
301b
301c
301d
401a
401b
401c
401d
403a
403b
403c
403d
405a
405b
405c
405d 601
603
Frequency
Frequency
$f(x) = \frac{1}{1 + e^{-3.7(x-1.7)}}$
(2, 0.752)
605
$f(x) = \frac{1}{1 + e^{-3(x-1.2)}}$
607

Figure 10:
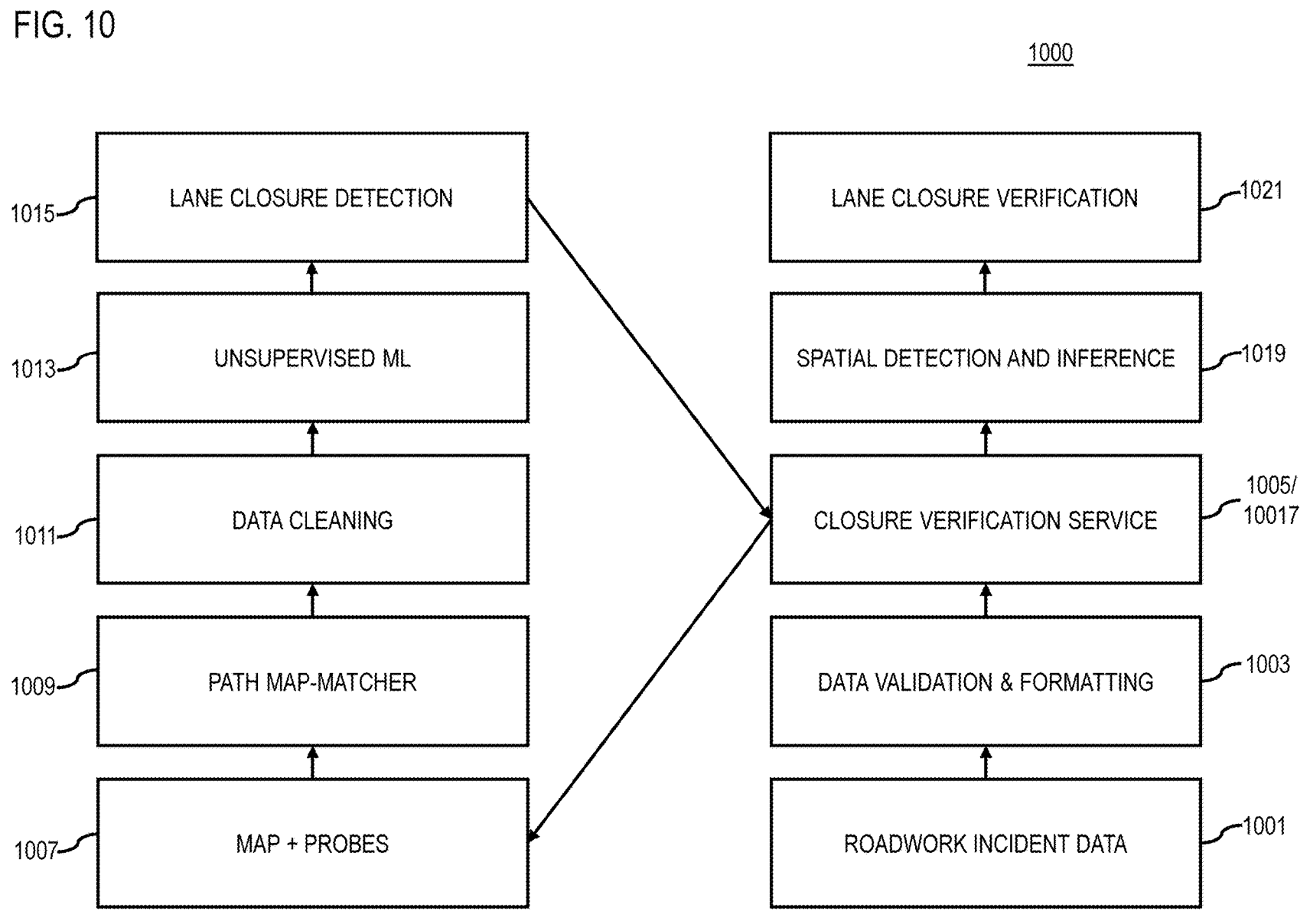

1001 ROADWORK INCIDENT DATA

1003 DATA VALIDATION & FORMATTING

1005/10017 CLOSURE VERIFICATION SERVICE

1019 SPATIAL DETECTION AND INFERENCE

1021 LANE CLOSURE VERIFICATION

1007 MAP + PROBES

1009 PATH MAP-MATCHER

1011 DATA CLEANING

1013 UNSUPERVISED ML

1015 LANE CLOSURE DETECTION 113
1201
1203
1205
1215
1214
1217
1219
LANE CLOSURE CONFIRMED → MOVE RIGHT
Herald St
Albany St
N
1221
RECALCULATE ROUTE
1223
ADJUST THRESHOLDS 1201
113
1203
NEW ROUTE ADDS 15 MINUTES
101
1215
1209
1223
1225
1219
RECALCULATE ROUTE
1221
ADJUST THRESHOLDS
N TERMINAL 1601
1617
1635
1615
1641
1639
1637
1609
1605
Demodulator
Down-Converter
LNA
1625
1621
AUDIO INTERFACE
1613
CODEC
DSP
Equalizer
RF Interface
Synthesizer
1633
Duplexer
ADC
DAC
1629
1623
1643
Modulator
Up-Converter
PA
1619
ASIC BACKPLANE
1611
1645
1627
1631
MCU
MEMORY
Keyboard
1647
Battery Interface & Power Control
Display
1607
1651
1603
SIM Card
1649
1620

METHOD, APPARATUS, AND SYSTEM FOR VERIFYING A LANE CLOSURE USING PROBE DATA

RELATED APPLICATION

This application claims priority from U.S. Provisional Application Ser. No. 63/132,658, entitled "METHOD, APPARATUS, AND SYSTEM FOR VERIFYING A LANE CLOSURE USING PROBE DATA," filed on Dec. 31, 2020, the contents of which are hereby incorporated herein in its entirety by this reference.

BACKGROUND

Location-based service providers (e.g., mapping and navigation providers) are continually challenged to provide compelling services and applications. One area of development relates to providing consumers real-time traffic information at a granularity to support advanced applications such as autonomous driving. Such advanced applications generally require highly accurate maps (e.g., digital maps) and vehicles equipped with sophisticated location-based sensors (e.g., global positioning system (GPS) sensors, Light Detection and Ranging (LiDAR) sensors, etc.) so that navigation systems can generate lane-level routing. However, detecting a lane closure on a road segment using vehicle (probe) speeds is difficult because vehicles can still flow through a road or a link with a lane closure. As such, the road or the link may erroneously appear unencumbered to service providers, which can lead to inaccurate routing or guidance and/or user delay. Accordingly, mapping service providers face significant technical challenges to detect and verify lane closures with confidence and low latency.

SOME EXAMPLE EMBODIMENTS

Therefore, there is a need for verifying a lane closure using probe data.

According to one embodiment, a method comprises receiving probe data collected from one or more probe devices traveling a road link. The method also comprises performing a spatial clustering of the probe data with respect to a longitudinal axis of the road link. The method further comprises comparing the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering. The method also comprises detecting a lane closure on the road link based on determining that the cluster shift is greater than a shift distance threshold. The method further comprises providing the detected lane closure as an output.

According to another embodiment, an apparatus comprises at least one processor, and at least one memory including computer program code for one or more computer programs, the at least one memory and the computer program code configured to, with the at least one processor, cause, at least in part, the apparatus to receive probe data collected from one or more probe devices traveling a road link. The apparatus is also caused to perform a spatial clustering of the probe data with respect to a longitudinal axis of the road link. The apparatus is further caused to compare the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering. The apparatus is also caused to detect a lane closure on the road link based on determining that the cluster shift is greater than a shift distance threshold. The apparatus is further caused to provide the detected lane closure as an output.

According to another embodiment, a non-transitory computer-readable storage medium having stored thereon one or more program instructions which, when executed by one or more processors, cause, at least in part, an apparatus to receive probe data collected from one or more probe devices traveling a strand, wherein the strand comprises a road link and at least one other connected road link. The apparatus is also caused to perform a spatial clustering of the probe data with respect to a longitudinal axis of the road link, the at least one other connected road link, or a combination thereof. The apparatus is further caused to compare the spatial clustering of the probe data to a historical spatial clustering of historical probe data of the strand to determine respective cluster shifts across the stand, wherein the respective cluster shifts indicate that at least one cluster of the spatial clustering has shifted spatially to the left or the right relative to at least one other cluster of the historical clustering. The apparatus is also caused to detect a lane closure on the stand based on determining that the respective cluster shifts are greater than a shift distance threshold. The apparatus is further caused to providing the detected lane closure as an output.

According to another embodiment, an apparatus comprises means for receiving probe data collected from one or more probe devices traveling a road link. The apparatus also comprises means for performing a spatial clustering of the probe data with respect to a longitudinal axis of the road link. The apparatus further comprises means for comparing the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering. The apparatus also comprises means for detecting a lane closure on the road link based on determining that the cluster shift is greater than a shift distance threshold. The apparatus further comprises means for providing the detected lane closure as an output.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 3A and 3B are diagrams illustrating an example lane closure detection using probe data, according to example embodiment(s);

FIG. 10 is a flowchart of a process for lane closure detection and lane closure verification, according to example embodiment(s);

DESCRIPTION OF SOME EMBODIMENTS

Examples of a method, apparatus, and computer program for verifying a lane closure using probe data are disclosed. In the following description, for the purposes of explanation, numerous specific details are set forth to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form to avoid unnecessarily obscuring the embodiments of the invention.

Figure 1:
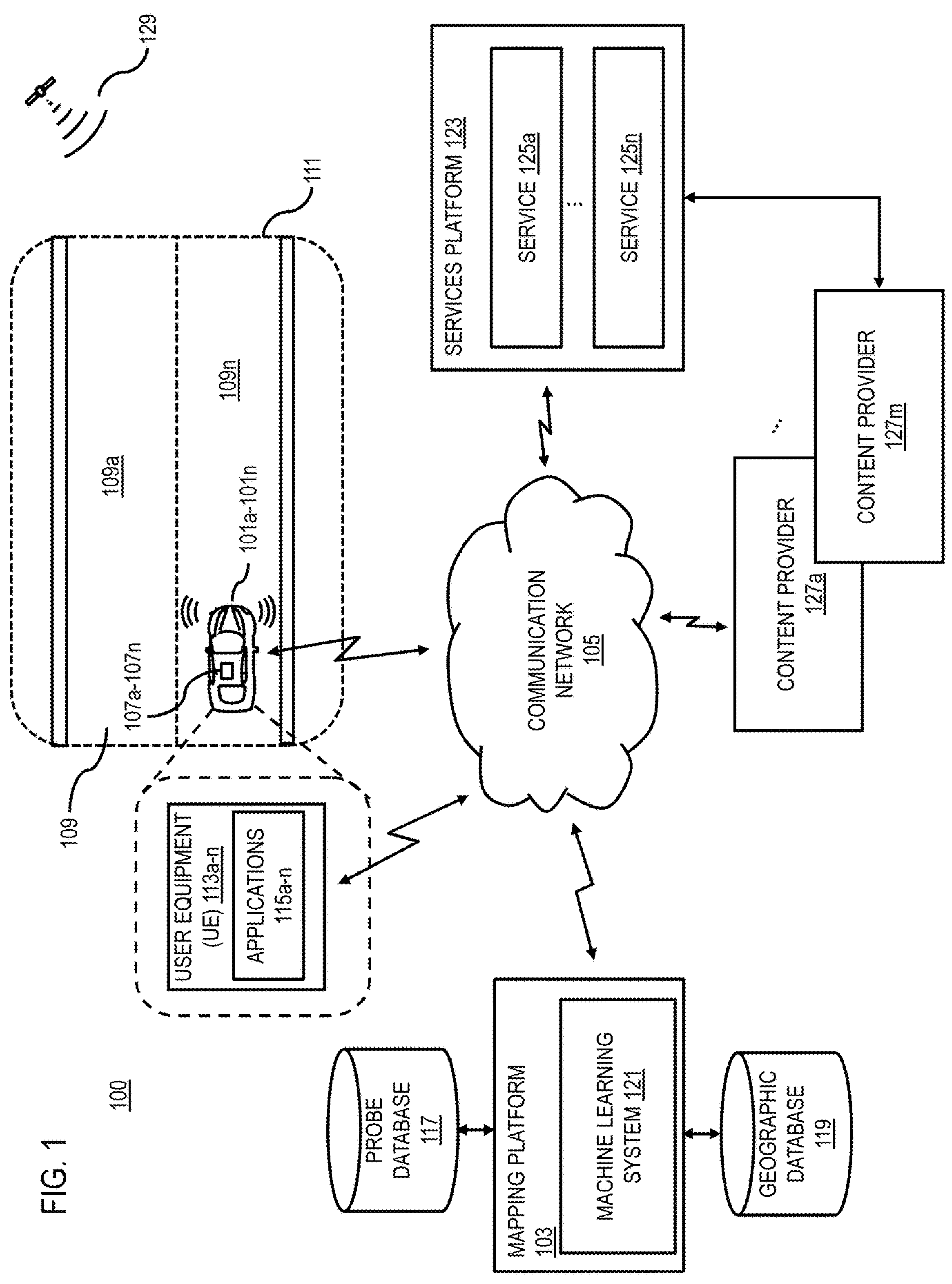
FIG. 1 is a diagram of a system capable of verifying a lane closure using probe data, according to example embodiment (s)

FIG. 1 is a diagram of a system capable of verifying (e.g., automatically) a lane closure using probe data, according to example embodiment(s). As described above, location-based service providers (e.g., mapping and navigation providers) are continually challenged to provide compelling services and applications. One area of development relates to providing consumers real-time traffic information at a granularity to support advanced applications such as autonomous driving. Such advanced applications generally require highly accurate maps (e.g., digital maps) and vehicles (e.g., probes) equipped with sophisticated location-based sensors (e.g., GPS sensors, LiDAR sensors, etc.) so that navigation systems can generate lane-level routing.

Traditional mapping approaches often attempt to approximate lane-level data by looking at the speed divergences and directions of traffic flow on road segments. However, while these traditional approaches may capture speed divergences leading up to a lane closure, they often do not know or cannot identify the specific lanes of the road or link that the traffic speeds are associated with (e.g., due to a lack of lane-connectivity data).

Figure 2:
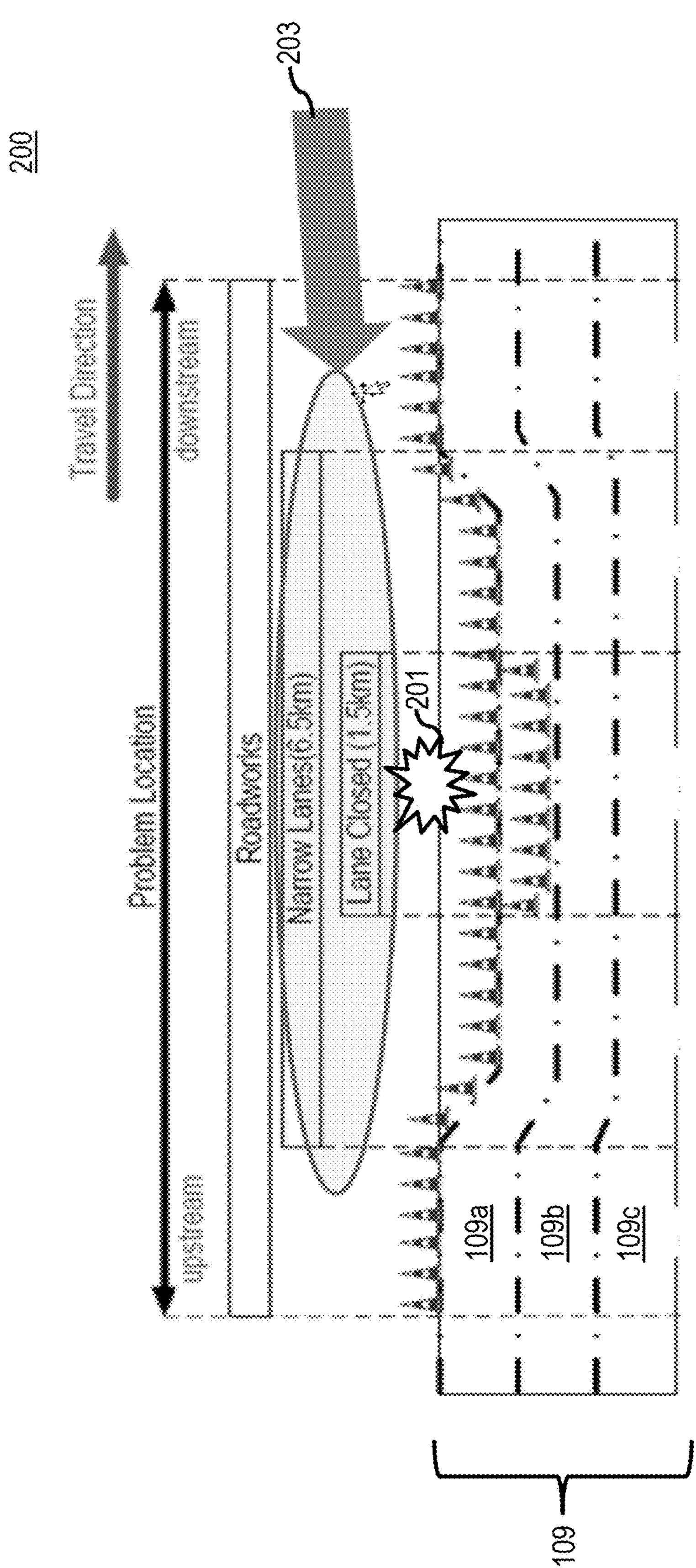
FIG. 2 is a diagram of an example lane level report of roadworks closing or reducing lanes of a link, according to example embodiment(s)

By way of example, a lane closure can occur when one or more lanes of a road segment/link is closed or blocked or barred such that no vehicle can traverse on such lane(s). For example, there are generally two types of lane closures: (1) planned/scheduled lane closure (e.g., due to roadworks, construction, event planning, etc.); and (2) unplanned lane closure (e.g., due to an accident, vehicle breakdown, etc.). FIG. 2 is a diagram of an example lane level report 200 of roadworks closing or reducing lanes of a link (e.g., link 109), according to example embodiment(s). For example, in this instance lane 109*a* of the road link 109 may be closed and lanes 109*b* and 109*c* may be narrowed or constricted due to an event 201 (e.g., an accident), which can affect lane-level navigation in the area highlighted by the arrow 203.

Obtaining up-to-date and/or real-time data on traffic flow and lane-level events (e.g., lane closures) can also pose a considerable challenge. For example, it is critical for services providers to be aware of these events in under 10 minutes, and ideally even faster so that navigation systems can generate safe lane-level routing and/or re-routing. Traditional traffic service providers can report real-time static incidents on a specific road segment and send, if appropriate, warning messages to upstream drivers ahead of incidents based on multiple input resources (e.g., local or community resources, traffic reports, crowdsourcing, etc.). However, this information can quickly become out of date and/or stale, particularly with respect to unplanned lane closures (e.g., due to an accident, vehicle breakdown, etc.). Moreover, because the entire road or link is often not closed during a lane closure, there is still a flow of traffic making it very challenging to detect lane closures via probe speeds. As such, the road or link may mistakenly appear unencumbered, which can cause erroneous navigation guidance and/or user delay. Consequently, users may gradually lose their trust in the service if such mistakes occur frequently.

To minimize the provision of erroneous navigation to users (e.g., drivers, autonomous vehicles, etc.), traffic service providers have traditionally deployed human resources to monitor lane closures from multiple sources. However, human or manual monitoring and verification can be resource intensive and may not scale well. For example, as the number of lane closures increase (e.g., with increased coverage area), so does the labor cost and chances for human error. Accordingly, mapping service providers face significant technical challenges to cost effectively verify lane closures with confidence and low latency.

To address these technical problems, a system 100 of FIG. 1 introduces a capability to verify a lane closure using probe data, according to example embodiment(s). In one embodiment, the system 100 of FIG. 1 may include one or more vehicles 101*a*-101*n* (also collectively or individually referred to as vehicles 101 or a vehicle 101, respectively) (e.g., a standard vehicle, an autonomous vehicle, a heavily or highly assisted driving (HAD) vehicle, a semi-autonomous vehicle, etc.) having connectivity to a mapping platform 103 via the communication network 105. In one instance, the vehicles 101 can include one or more vehicle sensors 107*a*-107*n* (also collectively referred to as vehicle sensors 107) (e.g., global positioning system (GPS) sensors, probe sensors, etc.) to provide the system 100 with historical and/or real-time probe data collected from the vehicles 101 that are travelling or have traveled on one or more lanes of a road link 109 (e.g., lanes 109*a*-109*n*) of a digital map 111.

In one embodiment, the system 100 can also collect real-time probe data from one or more user equipment (UE) 113*a*-113*n* (also collectively or individually referred to UEs 113 or a UE 113) associated with a vehicle 101 (e.g., an embedded navigation system), a user or a passenger of the vehicle 101 (e.g., a mobile device, a smartphone, etc.), or a combination thereof. In one instance, the UEs 113 can include one or more applications 115*a*-115*n* (also collectively referred to as applications 115) (e.g., a navigation application, a mapping application, etc.). In one embodiment, the probe-data collected by the vehicle sensors 107, the UEs 113, or a combination thereof may be stored by the system 100 in the probe database 117, the geographic database 119, or a combination thereof via the communication network 105.

In one embodiment, the system 100 can determine a vehicle lane pattern for a road segment or link (e.g., road link 109) based on the historical and/or real-time probe data collected from the vehicles 101 that are travelling or have traveled through the road segment or link. In one instance, the vehicle lane pattern may comprise information regarding the number of lanes along the road segment (e.g., road link 109), a lane identifier for each lane of the road segment (e.g., lanes 109*a*-109*n*), a representative distance parameter (e.g., mean, mode, median, average, etc.), etc. In one instance, the system 100 can determine a distance value (d-value) metric or distance parameter {d} (e.g., d− or d+) for each probe point or data point (e.g., each dot 301) received or collected from a vehicle 101, a UE 113, or a combination thereof, having traveled or traveling on the road link 109, as depicted in FIGS. 3A and 3B.

Figures 3A, 3B:
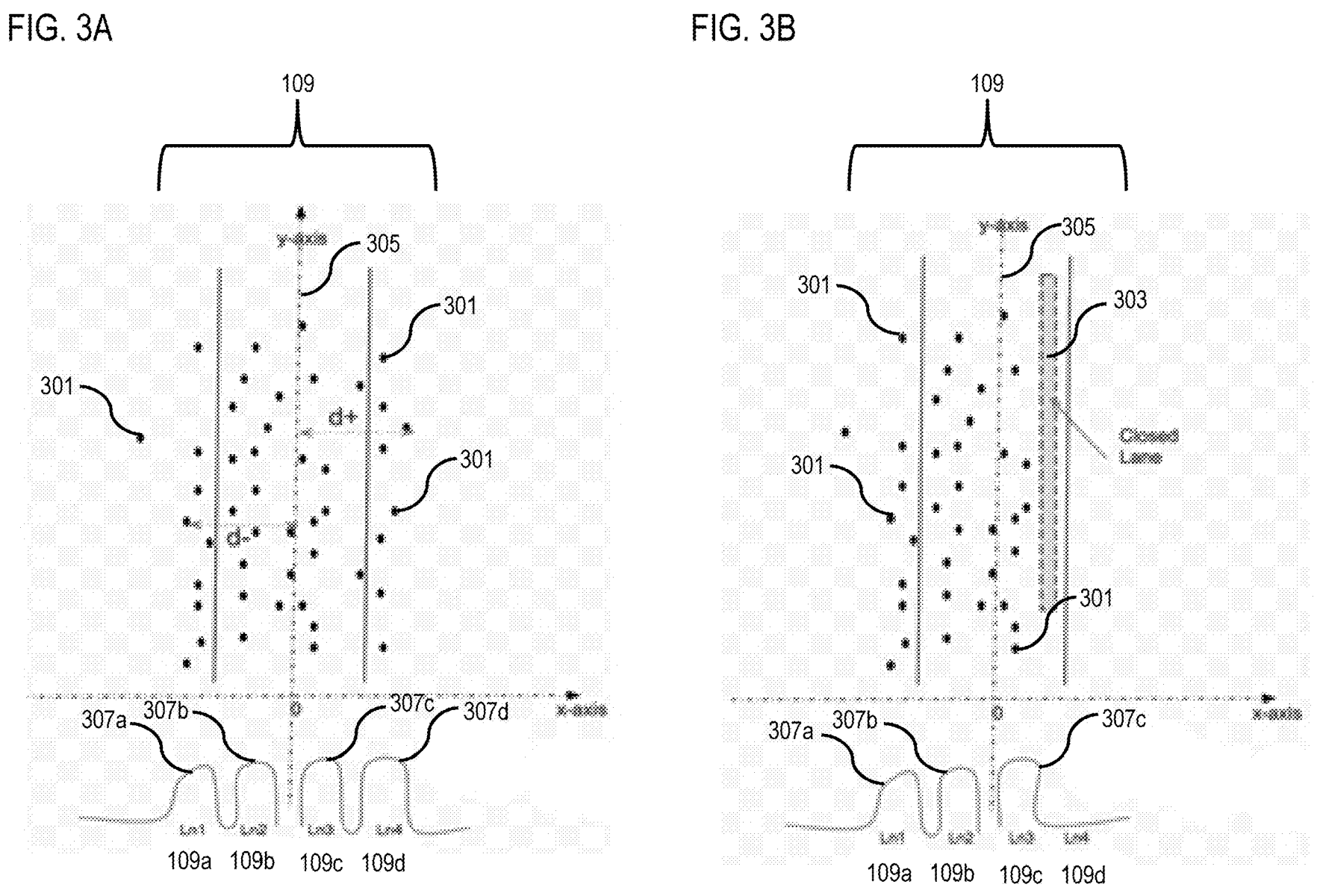

FIGS. 3A and 3B are diagrams illustrating an example lane closure detection using probe data, according example embodiments. In this example, FIGS. 3A and 3B include a plurality of probe points 301 along a road segment or link (e.g., link 109). In one embodiment, each dot 301 indicates a location of a probe device (e.g., a vehicle 101, a UE 113, or a combination thereof). In this example, FIG. 3A illustrates a portion of the road segment or link 109 without a lane closure (e.g., representing free flow traffic) and FIG. 3B illustrates the same or similar portion of the road segment or link 109 during a lane closure 303 (e.g., due to roadwork, an accident, etc.).

In one instance, the system 100 can determine a distance parameter {d} that indicates a distance for each probe point 301 from a reference line 305 (e.g., a center vector line, a y-axis, etc.). In one instance, the system 100 can determine that points 301 on a first side of the reference line 305 (e.g., to the left of the reference line 305) may be assigned a negative distance parameter (e.g., d−) and that points 301 on a second side of the reference line 305 (e.g., to the right of the reference line 305) may be assigned a positive distance parameter (e.g., d+). In one instance, the system 100 can process the distance parameters to identify spatial clusters 307 (e.g., 307*a*, 307*b*, 307*c*, and 307*d*). In this example, the spatial clusters 307*a*, 307*b*, 307*c*, and 307*d* correspond to lane 109*a*, lane 109*b*, lane 109*c*, and lane 109*d* of the road segment 109 in FIG. 3A, respectively, and the spatial clusters 307*a*, 307*b*, and 307*c* correspond to lane 109*a*, lane 109*b*, and lane 109*c* of the road segment 109 in FIG. 3B, respectively, reflecting the lane closure 305 of FIG. 3B. For example, vehicles 101 traveling in a particular lane along the road segment 109 will have a similar distance from and/or position relative to the reference line 305 of the road segment 109. In one instance, the system 100 can store the determined lane pattern in the geographic database 119 for future use.

In one embodiment, the system 100 can use a k-means algorithm (e.g., using the machine learning system 121) to inspect the one or more cluster shifts using the d-value metric. In one instance, the system 100 can generate a lane closure (LC) metric (e.g., using a lane closure detection (LCD) algorithm) that is directly proportional to the magnitude and direction of cluster shift, which represents shift in lanes on the road or link (e.g., link 109) during a lane closure event (e.g., construction, an accident, etc.). In one instance, the system 100 can determine a lane closure based on a large LC metric relative to a historic value, an average value, etc. for the same road or link. In one embodiment, the system 100 can use the LC metrics from the LCD algorithm at link level to make sense of the lane closure event on an entire road segment or strand.

Figures 4A, 4B:
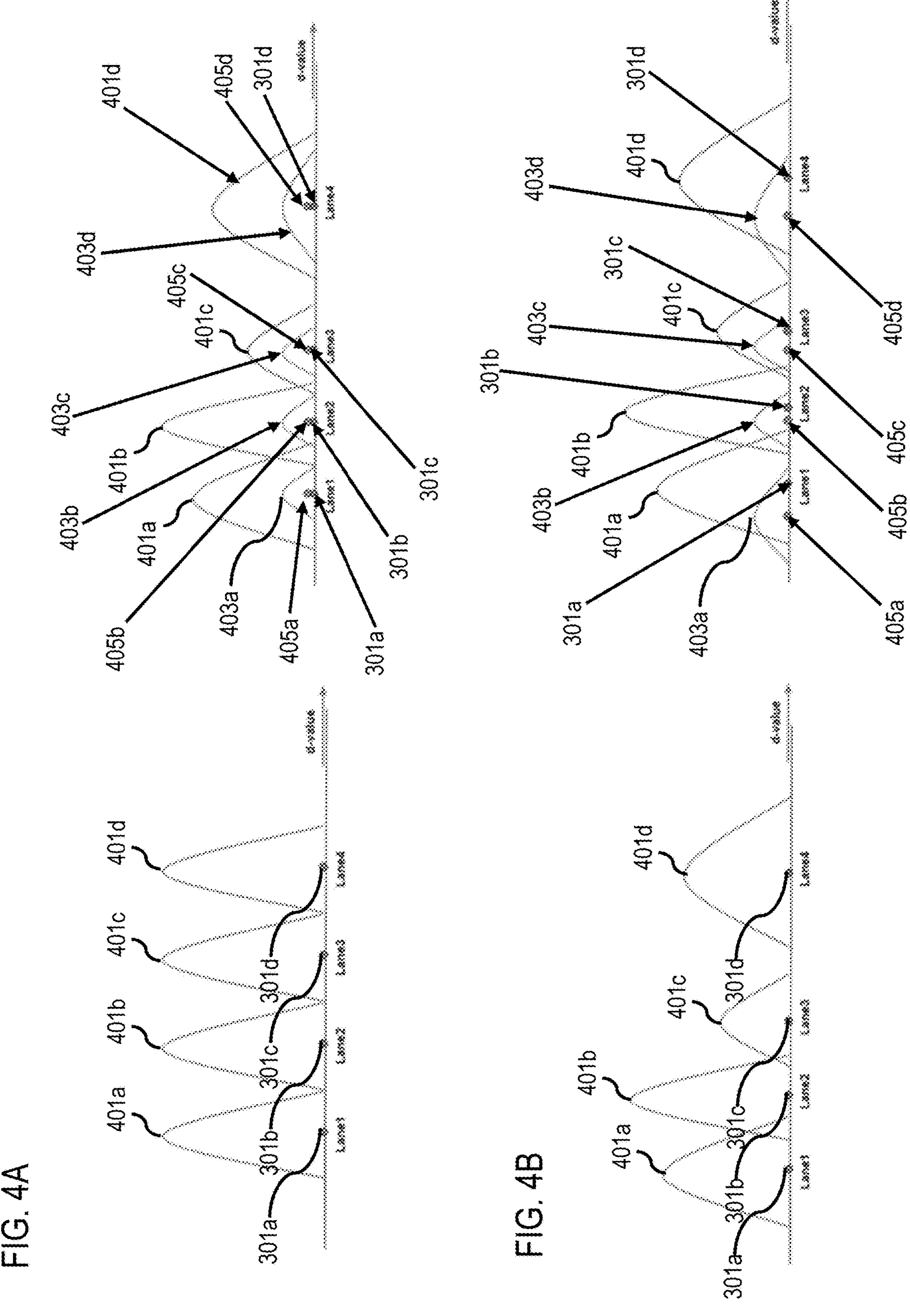
FIGS. 4A and 4B are diagrams illustrating example mean cluster shifts, according to example embodiment(s)

FIGS. 4A and 4B are diagrams illustrating example mean cluster shifts, according to example embodiments. In this example, FIGS. 4A and 4B illustrate a comparison of historical probe clusters 401*a*, 401*b*, 401*c*, and 401*d* and real-time probe clusters 403*a*, 403*b*, 403*c*, and 403*d* corresponding to probe points 301*a-d* (historic) and probe points 405*a-d* (real-time) which traveled or are traveling on lanes 1-4, respectively, of a road segment or link (e.g., road segment 109) in an ideal scenario (FIG. 4A) and in real time (FIG. 4B). In one instance, in the ideal scenario, all four lanes are unencumbered, and the historic and real-time probe points and corresponding clusters are relatively aligned in terms of respective locations on the road segment or link. Referring to FIG. 4B, the system 100 can determine one or more cluster shifts (e.g., right side of FIG. 4B) between the historical probe clusters 401*a*-401*d* and the real-time probe-based clusters 403*a*-403*d*, which can be indicative of a lane event, a lane closure, etc.

Figure 4C:
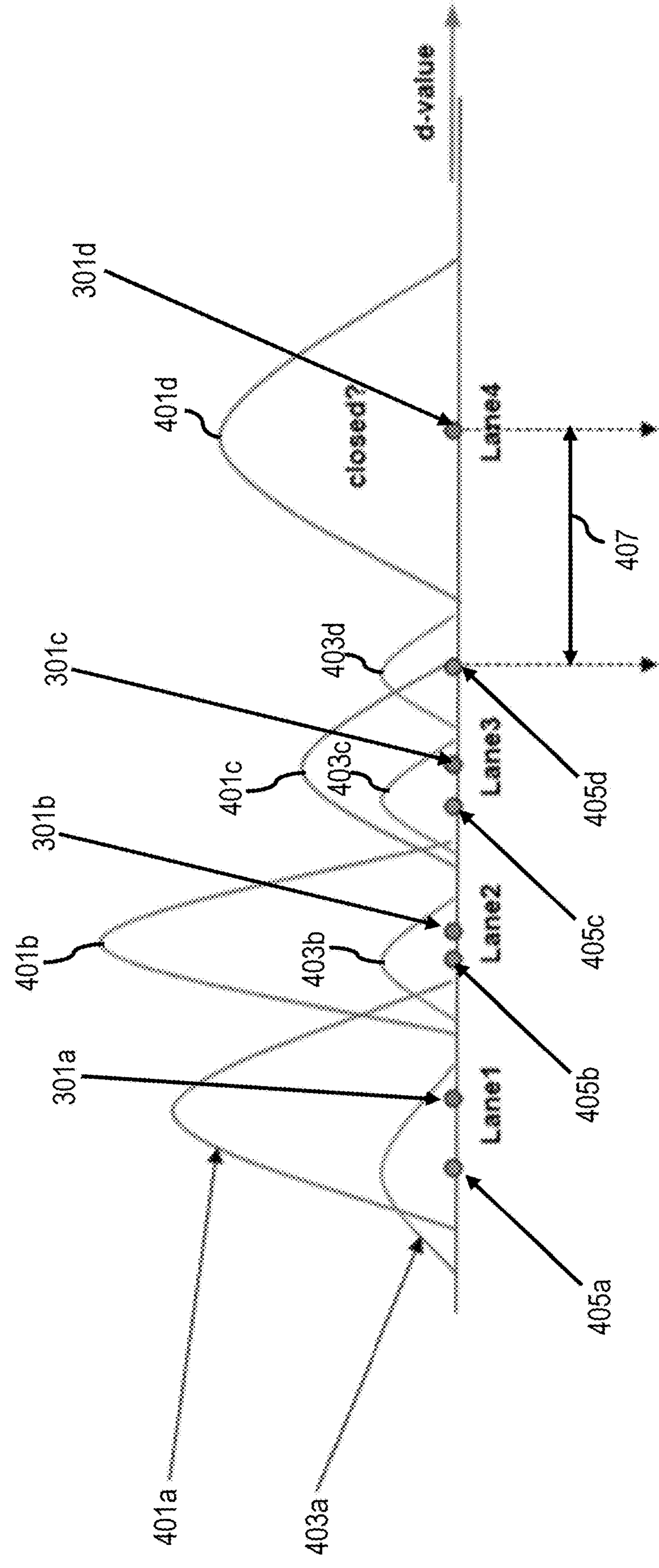
FIG. 4C is a diagram illustrating an example lane cluster shift detection on a link using a distance value metric, according to example embodiment(s)

FIG. 4C is a diagram illustrating an example lane cluster shift detection on a link (e.g., link 109) using a d-value metric, according to example embodiments. Referring to FIG. 4C, in one embodiment, following the example of FIG. 4B, the system 100 can inspect the lane cluster shifts on the link (e.g., link 109) using a d-value metric. In this example, the system 100 can determine that the real-time probe data cluster 403*d* of lane 4 is shifted a d-value 407 to the left relative to the historic probe data cluster 401*d*. In one instance, the system 100 can determine that a lane cluster metric greater than a threshold value (x) corresponds to a closed lane (e.g., lane 4), a lane shift metric less than 0 corresponds to a lane(s) shift right and a lane shift metric greater than 1 corresponds to a lane(s) shift left. In one instance, the system 100 can use the following formula to determine whether the probe cluster represents a lane closure or a lane shift right or left for a link with K number of clusters as follows:

$$LC-\text{metric} = \frac{\sum_{i=1}^{K} [Lh_{mean} - Lr_{mean}]/\text{Lh\_std}}{K}$$

$$LC-\text{metric} > x = > lane(s) closed$$

$$LS-\text{metric} = \frac{\sum_{i=1}^{K} [Lh_{mean} - Lr_{mean}]/\text{Lh\_std}}{K}$$

In one embodiment, the system 100 can also determine the leftmost lane shift and the rightmost lane shift for a link with K number of lanes (e.g., lanes 109*a*-109*n*) using the following formula:

$$\bullet LC-\text{metric} = \frac{\sum_{i=1}^{K} [Lh_{mean} - Lr_{mean}]/\text{Lh\_std}}{K} \quad \text{LANE CLOSED}$$

$$\circ LC-\text{metric} > x = > lane(s) closed$$

$$\bullet LS-\text{metric} = \frac{\sum_{i=1}^{K} [Lh_{mean} - Lr_{mean}]/\text{Lh\_std}}{K} \quad \text{LANE SHIFT}$$

$$\circ lane(s) shift \text{ metric; } LC-\text{metric} < 0 => \text{lane}$$

-continued $$\bullet LLS-\text{metric} = \frac{\max(\text{Lh\_mean} - \text{Lr\_mean})}{K} \quad \text{LEFTMOST LANE SHIFT}$$

$$\circ LLS = \text{leftmost lane shift given } LLS-\text{metric}$$

$$\bullet \text{RLS}-\text{metric} = \frac{\max(\text{Lh\_mean} - \text{Lr\_mean})}{K} \quad \text{RIGHTMOST LANE SHIFT}$$

$$\circ LLS = \text{leftmost lane shift given } LLS-\text{metric}$$

Typical Values:

| | | |
|---|---|---|
| lc_metric = 0.742778 | lc_metric = 0.584805 | lc_metric = 1.60025 |
| ls_metric = 0.577146 | ls_metric = 0.584805 | ls_metric = −1.60025 |
| lls_metric = 1.35099 | lls_metric = 0.800221 | lls_metric = −0.272475 |
| rls_metric = 0.249638 | rls_metric = 0.141518 | rls_metric = −2.23686 |

In the above example, the system 100 can use the value of 2 as the lane cluster metric threshold. In this example, the typical values are provided by way of illustration and not as a limitation. In one instance, the system 100 can determine based on the above values that none of the lanes of the given link (e.g., link 109) are closed.

In one instance, the system 100 can determine or detect a lane closure at link level, then verify the lane closure using the lane closure metrics across a strand of links (e.g., using an HMM). In one instance, the system 100 can obtain the strand from other source(s) such as municipalities or respective geographic authorities or the stand may be stored in or accessible via the geographic database 119, or a combination thereof. By way of example, the system 100 can use an HMM to model probabilistic systems since it has easy ways to input domain (human) knowledge and does very well with small data. Given the low probe value on most links, this machine learning algorithm (e.g., HMM) is well suited for this problem.

In one embodiment, the system 100 can run the LCD algorithm at link level (e.g., using the machine learning system 121) and can generate one or more metrics that are the estimates or measure of the degree of likelihood to which a lane of a link (e.g., lanes 109*a*-109*n*) are closed and the side of the road the closure happened. In one instance, the system 100 (e.g., using the HMM) can make sense of the one or more lane closure/lane shift metrics from the LCD algorithm across a strand of road by exploiting the spatial connectivity of the links and their contiguity to derive the most likely states of each link in the strand given a more robust estimate/prediction of lane-closure (FIG. 5A) and lane shift (FIG. 5B) on the entire stand.

Figures 5A, 5B:
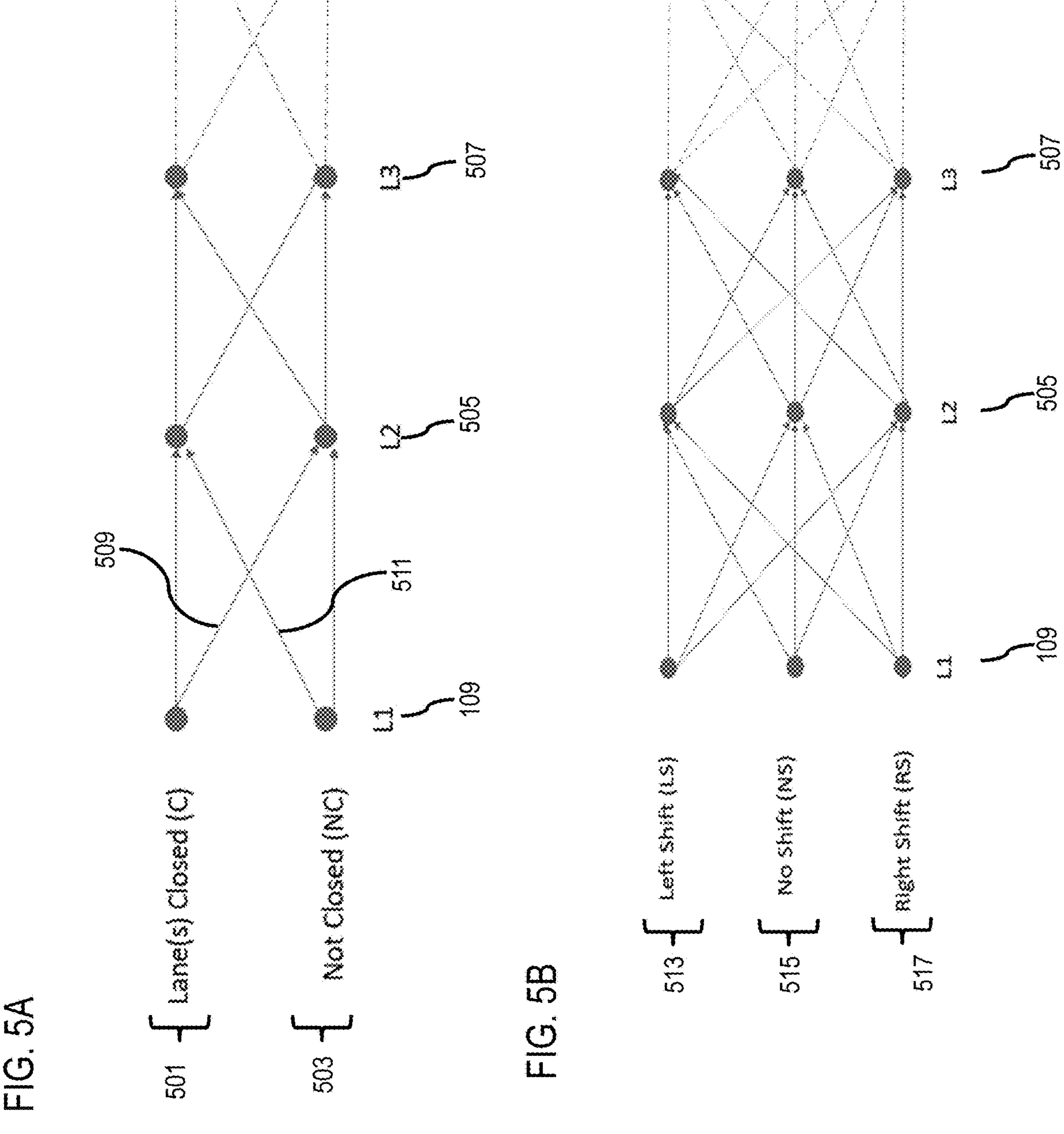
FIGS. 5A and 5B are diagrams illustrating lane closure and lane shift detection across a strand using a Hidden Markov Model (HMM), respectively, according to example embodiment(s)

FIGS. 5A and 5B are diagrams illustrating lane closure and lane shift detection across a strand using HMM, respectively, according to example embodiment(s). In one embodiment, the system 100 can determine or detect (e.g., using the Viterbi algorithm) a lane closure "detection" across a strand using a machine learning algorithm (e.g., HMM), as depicted in the example trellis diagram 500 in FIG. 5A. Referring to FIG. 5A, in this example, X represents possible states→possible state of link 109 (e.g., lane closed 501 or lane not closed 503); y represents possible observations→sequence of links in a strand L1 (109), L2 (505), L3 (507), . . . LN; a represents state transition probabilities→possible state change closure (501) to non-closure (503) as depicted by the arrow 509 and vice-versa as depicted by the arrow 511; and b represents the output/emission probabilities (601 and 605 of FIG. 6)→the chance of having the state X occurring on y. This is the probability of a strand being the state of closure or non-closure as obtained from the one or more metrics from the LCD algorithm.

In one instance, the system 100 can determine or detect (e.g., using the Viterbi algorithm) a lane shift across a strand using a machine learning algorithm (e.g., HMM), as depicted in the trellis diagram 520 in FIG. 5B. Referring to FIG. 5B, in this example, X represents possible states→possible states of a link (e.g., either the lane(s) of a link shifted left 513, shifted right 515, or no shift 517; y represents possible observations→sequence of links in a strand (e.g., L1 (109), L2 (505), L3 (507), . . . LN; a represents state transition probabilities→possible state changes; and b represents the output/emission probabilities (603 and 607 of FIG. 6)→the chances of having the state X occurring on y. This is the probability of a stand being the possible states as obtained from the metrics from the LCD algorithm. By way of example, the possible state changes for each left shift 513, no shift 515, and right shift 517 are described in detail with respect to FIG. 8A.

Figure 6:
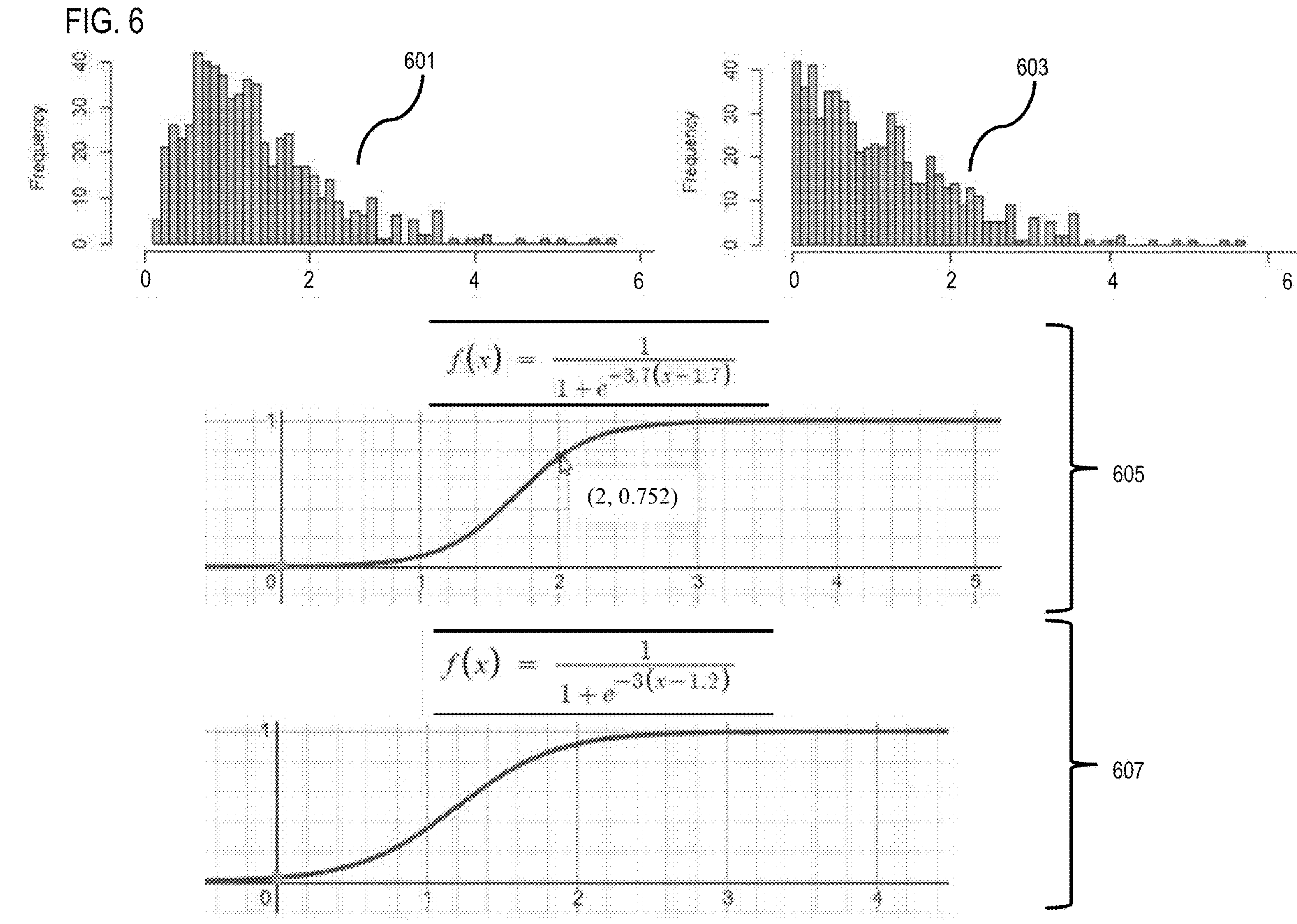
FIG. 6 is a diagram illustrating an example emission probability function for a HMM, according to example embodiment(s)

FIG. 6 is a diagram illustrating an example emission probability function for HMM, according to example embodiment(s). In one embodiment, the system 100 can convert the one or more metrics from the LCD algorithm to emission probabilities of the HMM (i.e., the conditional distribution of observations given states). In one instance, the output and/or emission probabilities of the HMM correspond to the probability of the vehicles 101 traveling a particular lane at the time each instance of the sequence of instances of probe information or data was captured and/or provided. By way of example, the probabilities can be depicted as a graph (e.g., a lane closure metric graph 603 and a lane shift metric 605) as shown in FIG. 6. In this example, the x-axis represents the number of lanes of the road or link (e.g., lanes 109*a*-109*n*) and the y-axis represents the frequency of closure or shifts, respectively. In one embodiment, the system 100 can determine the emission probability function for a lane closure or a lane shift using a Sigmoid function. For example, the system 100 can determine the function for lane closure 605 as follows: P(C)=f(x) and P(NC)=1−f(x) and for lane shift 607 as follows: If (x>0)=>P(LS)=0.99*f(x); P(RS)=0.01*f(x); and P(NS)=1-f(x). In these example functions, C=closure, NC=non-closure, LS=left shift, RS=right shift, and NS=no shift. Further, in this example, the HMM states have equal probabilities when there is no data.

Figure 7:
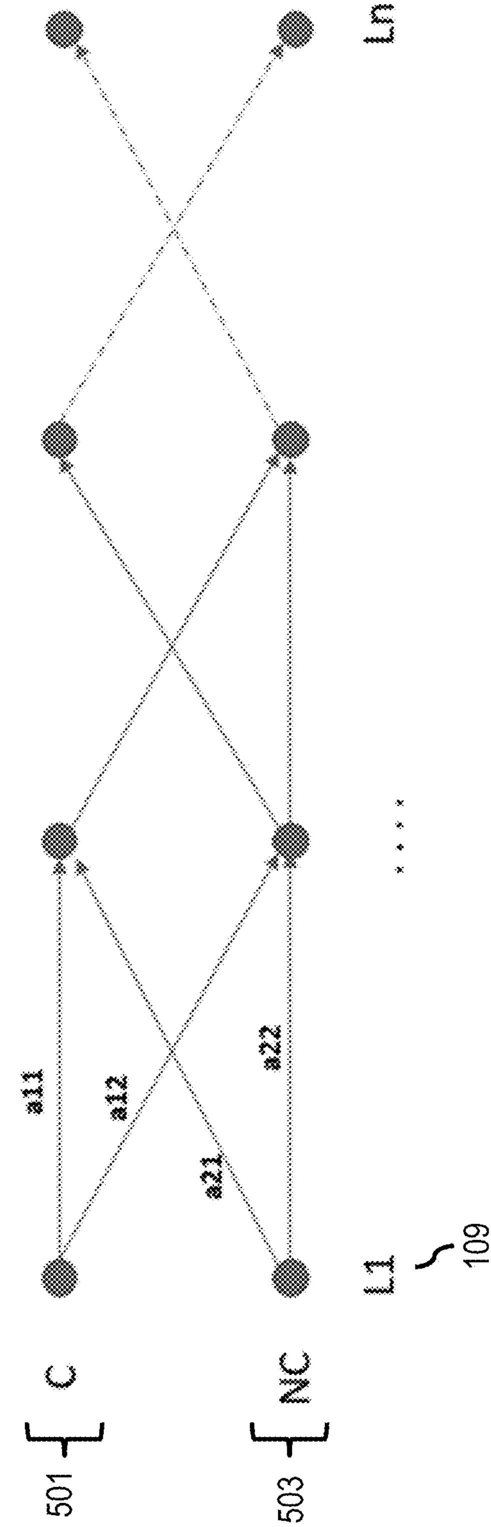
FIG. 7 is a diagram illustrating example transition probabilities for a lane closure HMM, according to example embodiment(s)
Figures 8A, 8B:
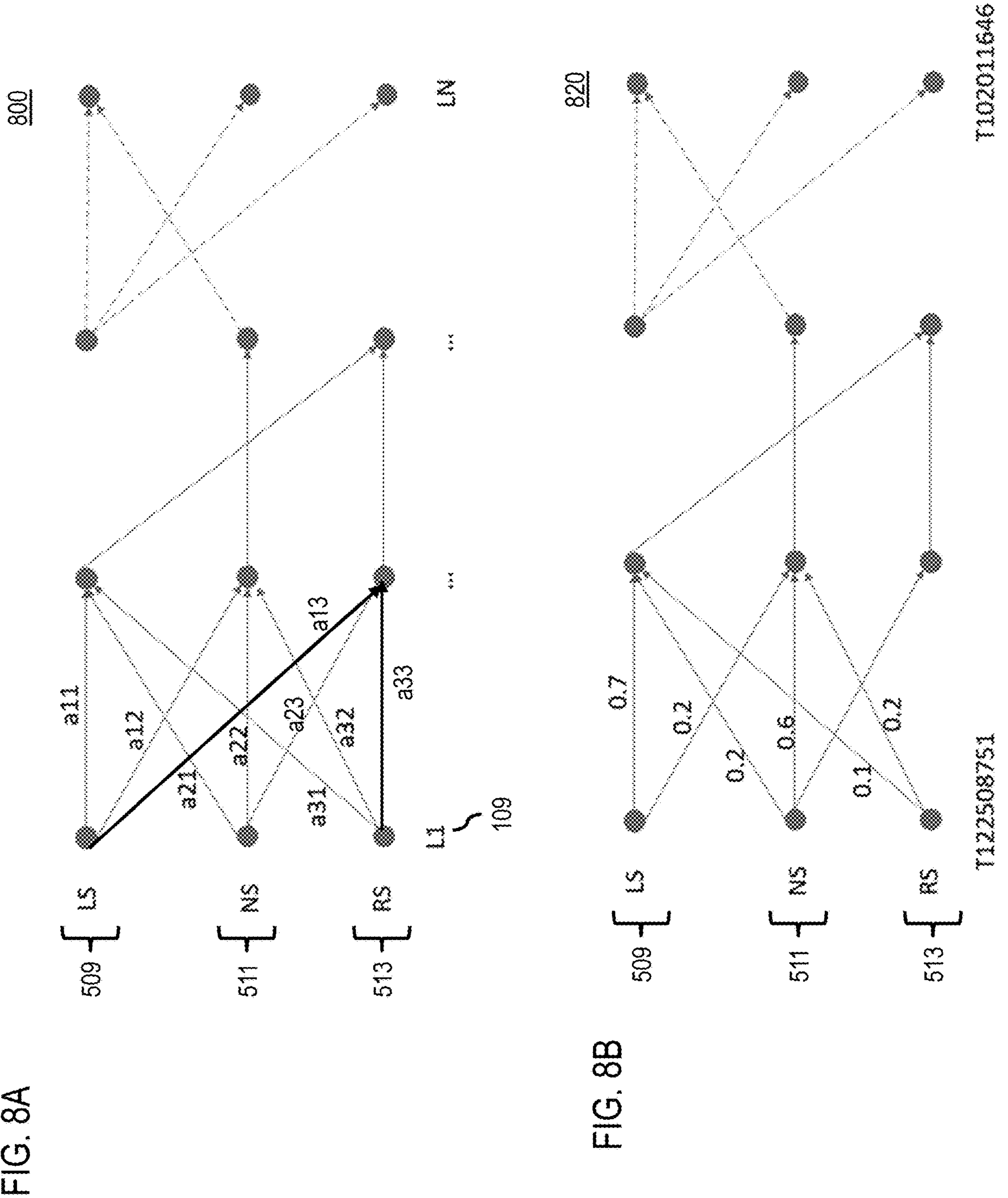
FIGS. 8A and 8B are diagrams illustrating example transition probabilities for lane shift HMM, according to example embodiment(s)

In one embodiment, the domain (human) knowledge can be inputted to the transition probabilities and the system 100 can make inferences (e.g., using the Viterbi algorithm) and elicit the most likely sequence of "hidden" states across the strand even when some links have sparse or no probe data, as depicted in the trellis diagram 700 of FIG. 7, the trellis diagram 800 of FIG. 8A, and the trellis diagram 820 of FIG. 8B. In one instance, the system 100 can use two separate HMM algorithms, one HMM algorithm for lane closure detection and one HMM algorithm for lane shift detection.

FIG. 7 is a diagram illustrating example transition probabilities for a lane closure HMM, according to example embodiment(s). Referring to FIG. 7, following the example of FIG. 5A, in one embodiment, the system 100 can determine the transition probabilities for a lane closure using an HMM algorithm as follows: (1) the C state 501 can remain closed (a11) or non-closed (a12); and (2) the NC state 503 can become closed (a21) or remain non-closed (a22).

FIGS. 8A and 8B are diagrams illustrating example transition probabilities for a lane shift HMM, according to example embodiment(s). Referring to FIG. 8A, in one instance, following the example of FIG. 5B, the system 100 can determine the transition probabilities for lane shift using an HMM algorithm as follows: (1) LS 509 can remain LS (a11), become NS 511 (a12), or become RS 513 (a13); (2) NS 511 can become LS 509 (a21), remain NS 511 (a22), or become RS 513 (a23); and (3) RS 513 can become LS 509 (a31), become NS 511 (a32), and remain RS 513 (a33). In one instance, the state transition probabilities of the HMM correspond to the lane change probabilities (FIG. 8B).

In one example, following the example of FIG. 8A, the system 100 can determine the transition probabilities for a lane shift HMM for the strand based on the links of the strand (e.g., Link &122508751 to Link T102011646), as depicted in FIG. 8B. In one instance, the lane change probabilities may be based on apriori information or data, historical probe information or data (e.g., stored in or accessible via the probe database 117, the geographic database 119, or a combination thereof), etc. In this example, the strand includes the links T122508751, T122508753, T1195509214, T1195509213, T744022417, T734753295, and T102011646 and the system 100 can determine the transition probabilities for a lane shift HMM based on the following example probabilities:

| | LS | NS | RS |
|---|---|---|---|
| LS | {a11, | a12, | a13} |
| NS | {a21, | a22, | a23} |
| RS | {a31, | a32, | a33} |
| LS | {0.7, | 0.2, | 0.1} |
| NS | {0.2, | 0.6, | 0.2} |
| RS | {0.1, | 0.2, | 0.7} |

In one embodiment, the system 100 can determine confidence modeling for the HMM. For example, the link-level confidence=emission probability of a selected state and strand-level confidence=average emission probabilities of selected states. In one instance, the confidence determination by the system 100 can be important to differentiate between results within a time epoch and to allow for selection or preselection of the results by the system 100 (e.g., using the machine learning system 121) based on a confidence threshold (e.g., a confidence metric of a value between 0 and 1).

Figure 9:
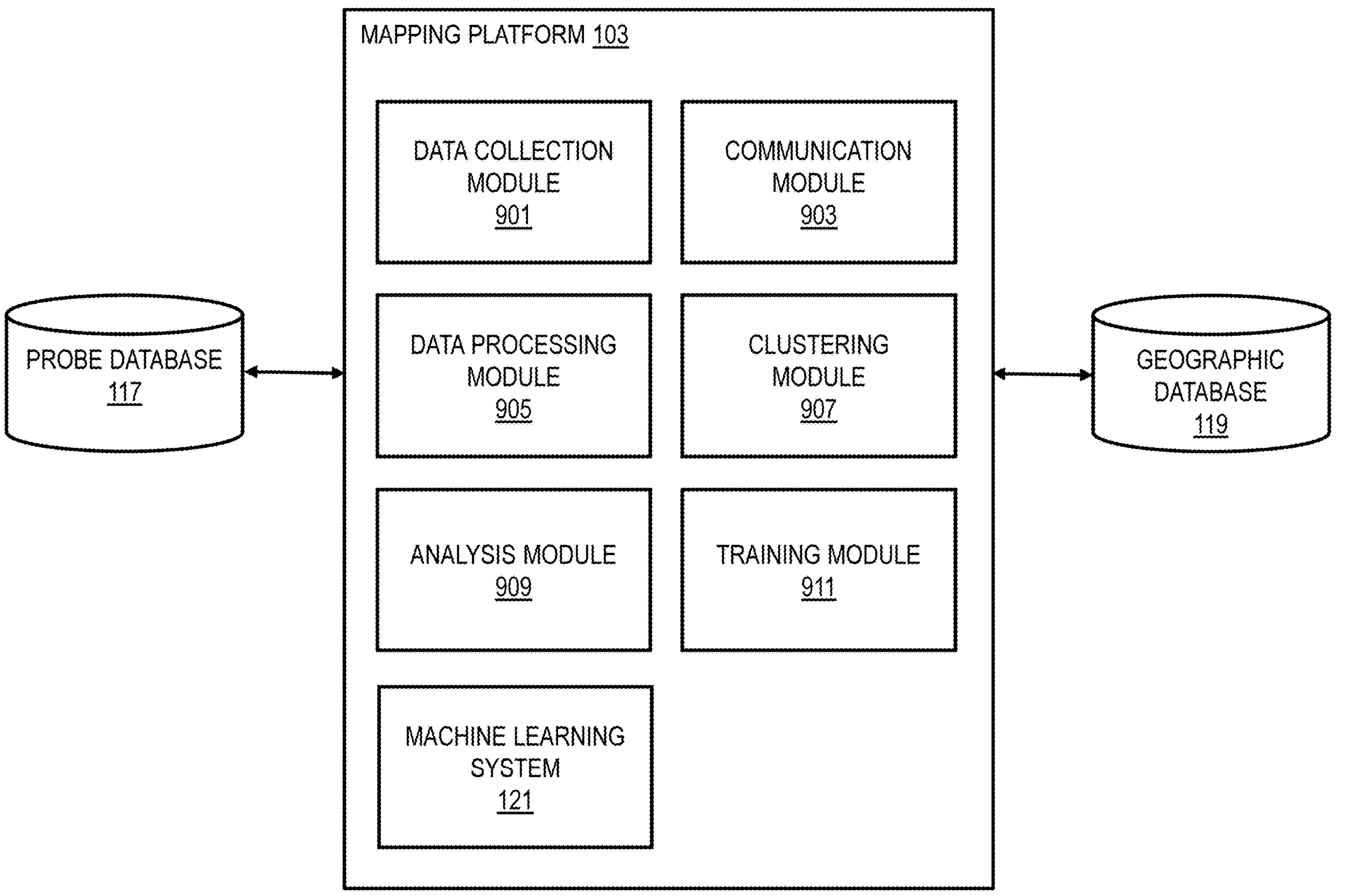
FIG. 9 is a diagram of the components of a mapping platform including a machine learning system, according to example embodiment(s)

FIG. 9 is a diagram of the components of a mapping platform 103, according to example embodiments. By way of example, the mapping platform 103 includes one or more components for detecting and verifying a lane closure and/or verifying a lane closure using probe data, according to example embodiment(s). It is contemplated that the functions of these components may be combined or performed by other components of equivalent functionality. In one embodiment, the mapping platform 103 includes a data collection module 901, a communication module 903, a data processing module 905, a clustering module 907, an analysis module 909, a training module 911, and the machine learning system 121, and has connectivity to the probe database 117 and the geographic database 119. The above presented modules and components of the mapping platform 103 can be implemented in hardware, firmware, software, or a combination thereof. Though depicted as a separate entity in FIG. 1, it is contemplated that the mapping platform 103 may be implemented as a module of any other component of the system 100. In another embodiment, the mapping platform 103 and/or the modules 901-911 may be implemented as a cloud-based service, local service, native application, or combination thereof. The functions of the mapping platform

Figure 11:
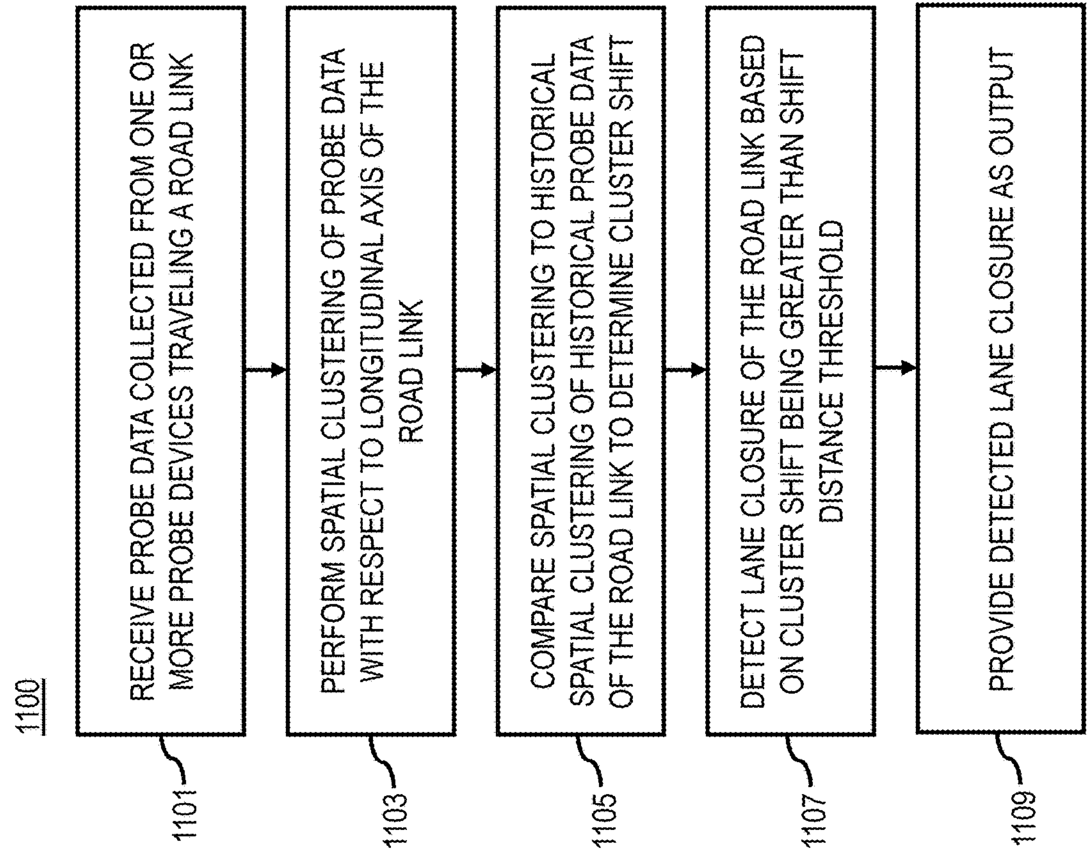
FIG. 11 is a flowchart of a process for verifying a lane closure using probe data, according to example embodiment(s)

103, the machine learning system 121, and/or the modules 901-911 are discussed with respect to FIGS. 10 and 11.

Figure 15:
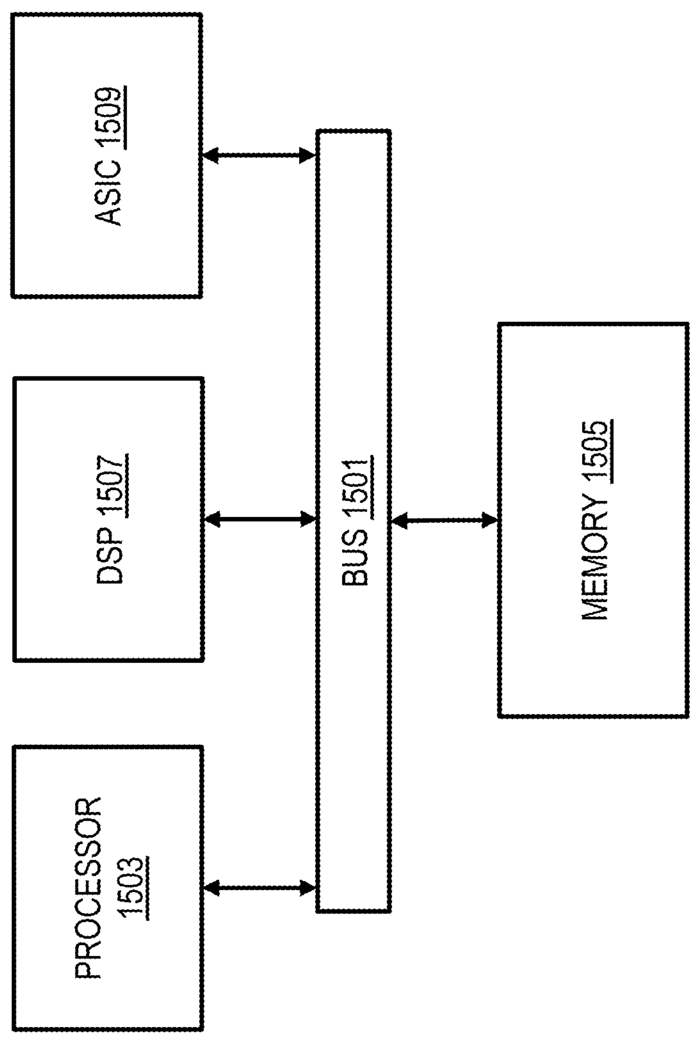
FIG. 15 is a diagram of a chip set that can be used to implement example embodiment(s)

FIG. 10 is a flowchart of a process for lane closure detection and lane closure verification, according to example embodiments. In various embodiments, the mapping platform 103, the machine learning system 121, and/or the modules 901-911 may perform one or more portions of the process 1000 and may be implemented in, for instance, a chip set including a processor and a memory as shown in FIG. 15. As such, the mapping platform 103, the machine learning system 121, and/or modules 901-911 can provide means for accomplishing various parts of the process 1000, as well as means for accomplishing embodiments of other processes described herein in conjunction with other components of the system 100. Although the process 1000 is illustrated and described as a sequence of steps, it is contemplated that various embodiments of the process 1000 may be performed in any order or combination and need not include all the illustrated steps. In this example, steps 1001, 1003, 1005, 1017, 1019, and 1021 are part of a verification process performed by the mapping platform 103, the machine learning system 121, and/or the modules 901-911 and steps 1007, 1009, 1011, 1013, and 1015 are part of a detection process performed by the mapping platform 103, the machine learning system 121, and/or the modules 901-911.

In step 1001, the data collection module 901 can determine (e.g., from various data sources) that a roadwork event has been reported (e.g., as roadworks incident data). In step 1003, the data collection module 901 in connection with the communication module 903 can determine that a team of humans monitoring traffic has performed a data validation process (e.g., to confirm that the roadwork is happening) and has labeled the stretch of road (e.g., a strand) around the work. In step 1005, the data collection module 901 can pick each link in the strand (e.g., fetch the LCD metrics for the strand).

In step 1007, on the detection side of the process 1000, the data processing module 905 can determine historical and current probes (e.g., based on links+latitude, longitude, and heading). In step 1009, the data processing module 905 can map-match the data (e.g., using Link-IDs) and can generate d-values according to the various embodiments described herein. In step 1011, the data processing module 905 can filter outliers (e.g., using statistical tests, outlier filtering, etc.). In step 1013, the machine learning system 121 can run a k-means clustering algorithm (e.g., unsupervised) to inspect the data and then in step 1015, the data processing module 905 can generate lane closure and shifts metrics.

In step 1017, on the verification side of the process 1000, the data collection module 901 can receive the data from the machine learning system 121 from step 1015. In step 1019, the communication module 903 can send the data as an input to the machine learning system 121 (e.g., using the HMM algorithm) which then runs the Viterbi inference algorithm in step 1021 to obtain the final lane closure result across a strand.

FIG. 11 is a flowchart of a process for verifying a lane closure using probe data, according to example embodiment(s). In various embodiments, the mapping platform 103, the machine learning system 121, and/or any of the modules 901-911 may perform one or more portions of the process 1100 and may be implemented in, for instance, a chip set including a processor and a memory as shown in FIG. 15. As such, the mapping platform 103, the machine learning system 121, and/or the modules 901-911 can provide means for accomplishing various parts of the process 1100, as well as means for accomplishing embodiments of other processes described herein in conjunction with other components of the system 100. Although the process 1100 is illustrated and described as a sequence of steps, its contemplated that various embodiments of the process 1100 may be performed in any order or combination and need not include all the illustrated steps.

In step 1101, the data collection module 901 can receive probe data collected from one or more probe devices traveling a road link. In one instance, the one or more probe devices can include vehicles 101 (e.g., standard vehicles, autonomous vehicles, HAD vehicles, semi-autonomous vehicles etc.) equipped with vehicle sensors 107 (e.g., probe sensors, GPS sensors, LiDAR sensors, etc.), UEs 113 (e.g., a mobile device, a smartphone, etc.), or a combination thereof. In one instance, the probe data includes real-time location probes collected from the vehicle sensors 107, the UEs 113, or a combination thereof traveling a road link (e.g., link 109). In one instance, the probe data may be reported as probe points, which are individual data records collected at a point in time that records telemetry data for that point in time. A probe point can include attributes such as: (1) probe ID, (2) longitude, (3) latitude, (4) heading, (5) speed, and (6) time. The receiving of the real-time probe data by the data collection module 901 is important to enable the data processing module 905 to compare such data against historical probe data for the road link to determine whether there is change in state for one or more lanes of the road link (e.g., a lane closure). By way of example, the probe data may be based on raw GPS probe positions (e.g., links+latitude and longitude) for each probe to subsequently enable the clustering module 907, for example, to create a layer of abstraction over a digital map (e.g., the digital map 111).

In step 1103, the clustering module 907 and/or the machine learning system 121 (e.g., using unsupervised machine learning (ML)) can perform a spatial clustering of the probe data with respect to a longitudinal axis of the road link. In one embodiment, the clustering module 907 can determine a distance parameter {d} that indicates a distance for each probe (e.g., probes 301) from a longitudinal axis (e.g., reference line 305) of the road link (e.g., link 109). In one instance, the clustering module 907 can determine that probes on a first side of the longitudinal axis (e.g., to the left of the axis) may be assigned a negative distance parameter (e.g., d−) and points on a second side of the longitudinal axis (e.g., to the right of the axis) may be assigned a positive distance parameter (e.g., d+). In one instance, the clustering module 907 can process the distance parameters to identify spatial clusters (e.g., clusters 307*a*, 307*b*, 307*c*, and 307*d*) corresponding to lanes of the road segment or link (e.g., lane 1, lane 2, lane 3, etc.). For example, probe data received by the data collection module 901 while traveling in a particular lane along a road link will have a similar distance from and/or position relative to the longitudinal axis of the road link. In one instance, each spatial cluster may represent a lane of the road link (e.g., link 109).

In one embodiment, the clustering module 907 in connection with the data processing module 905 can perform a map matching (e.g., lane-level or path) of the received probe data (e.g., real-time probe data) to one or more lanes of the road link (e.g., lanes 109*a*-109*n*) with respect to a longitudinal axis of the road link. In one instance, because the location measurement error in probe data (e.g., GPS error) can be greater than a lane width, the clustering module 907 and/or the data processing module 905 can use a probabilistic approach or equivalent to map match the probe data.

In one instance, the clustering module 907 can perform the spatial clustering of the probe data using a k-means clustering technique or an equivalent clustering technique based on the corresponding distance parameter {d}. In one instance, the clustering module 907 uses k-means clustering for cluster inspection where k=total number of lanes on the road link (e.g., link 109). By way of example, the spatial clustering of the probe data by the clustering module 907 can be important to filter or remove outliers from the lane closure analysis.

In step 1105, the data processing module 905 can compare the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering. The comparison of the spatial clustering of the probe data (e.g., real-time probe data) by the data processing module 905 against the corresponding historical spatial clustering data is important to determine whether there is a lane closure on the road link. In one instance, the historical spatial clustering and/or historical probe data may be stored in or accessible by the data processing module 905 via the probe database 117, the geographic database 119, or a combination thereof.

In step 1107, the analysis module 909 can detect a lane closure on the road link based on determining that the cluster shift is greater than a shift distance threshold. In one instance, the shift distance threshold can be based on historical spatial clustering of historical probe data, ground truth data, or a combination thereof from the road link (e.g., stored in or accessible via the probe database 117, the geographic database 119, or a combination thereof). By way of example, a lane closure can be a planned/scheduled lane closure (e.g., due to construction, event planning, etc.), an unplanned lane closures (e.g., due to roadworks, an accident, a vehicle breakdown, etc.), or a combination thereof. Basing the detection of the lane closure on a cluster shift rather than a single probe point by the analysis module 909 is important with respect to detecting and verifying a lane closure with confidence.

In one embodiment, the analysis module 909 can compute a LC metric based on a magnitude of the cluster shift, wherein the detecting of the lane closure is based on comparing the lane closure metric to a threshold value (e.g., a magnitude value). In one instance, the threshold value, like the shift distance threshold, may be based on the relevant historical spatial clustering of historical probe data, ground truth data, or a combination thereof stored in or accessible via the probe database 117, the geographic database 119, or a combination thereof. In this instance, the analysis module 909 can determine whether a lane closure has occurred based on the threshold value but the analysis module 909 may not yet be able to determine its location on the road link (e.g., link 109).

In one instance, the data processing module 905 can determine a direction of the cluster shift relative to the longitudinal axis (e.g., axis 305) of the road link (e.g., link 109), the direction being right (e.g., d+) or left (e.g., d−) and the analysis module 909 can determine a relative position of the lane closure on the road link based on the direction of the cluster shift. By way of example, if the analysis module 909 determines that the spatial clustering has shifted spatially to the left and that the cluster shift is greater than a shift distance threshold (e.g., 2), then the analysis module 909 can determine that the relative position of the lane closure is on the right side of the longitudinal axis (e.g., lane closure 303).

In one embodiment, the analysis module 909 can compute a LC metric based on a magnitude and the direction of the cluster shift, wherein the detecting of the lane closure is based on comparing the lane closure metric to a threshold value (e.g., a direction value). In one instance, the threshold value may be based on the historical spatial clustering of relevant historical probe data, ground truth data, or a combination thereof stored in or accessible via the probe database 117, the geographic database 119, or a combination thereof. By way of example, a very large LC-metric often indicates a lane closure.

In one instance, the data processing module 905 can determine respective cluster shifts for a strand comprising the road link and at least one other connected road link and the analysis module 909 can detect the lane closure, a lane shift, or a combination thereof for the strand based on the respective cluster shifts across the strand. In one instance, this process is like the processes described with respect to step 1107, except in this instance, the lane closure is being determined with respect a strand of road links as opposed to just one road link (e.g., link 109).

In one embodiment, the data processing module 905 and/or the machine learning system 121 (e.g., using supervised ML) can process the respective cluster shifts using at least one HMM algorithm to detect the lane closure, the lane shift, or a combination thereof across the strand. In one instance, the analysis module 909 can perform detection at link level and can produce the LC metrics, then the data processing module 905 and/or the machine learning system 121 can use the HMM algorithm for verification using the metrics across a strand of links. As described above, the HMM algorithm can make sense of the metrics from the analysis module 909 (LCD) across a strand of road links by exploiting the spatial connectivity of the links and their contiguity to derive the most likely state of each link in the strand given a more robust estimate/prediction of lane closure and lane shift on the entire strand. In one instance, the at least one Hidden Markov Model includes a first Hidden Markov Model for lane closure detection and a second separate Hidden Markov Model for lane shift detection.

In one instance, the analysis module 909 can generate respective LC metrics for the road link and the at least one other connected road link of the strand. In one instance, the LC metrics comprise a lane closure metric and a lane shift metric. In one instance, the data processing module 905 can convert the respective lane closure metrics to respective emission probabilities of the at least one Hidden Markov Model to detect the lane closure, the lane shift, or a combination thereof across the strand. In one embodiment, the respective emission probabilities are based on respective likelihoods of a link lane closure and a side of a road of the link lane closure determined based on the lane closure metrics.

In one embodiment, the analysis module 909 can determine transition probability data between one or more states of the at least one Hidden Markov Model based on one or more connectivity attributes, one or more spatial attributes, or a combination thereof of the road link and the at least one other connected road link of the strand. In one instance, the analysis module 909 can determine the transition probability data based on the domain (human) knowledge stored in or accessible via the geographic database 119. In one instance, the analysis module 909 and/or the machine learning system 121 (e.g., using the Viterbi algorithm) can make an inference and elicit the most likely sequence of "hidden" states across the strand even when some links have sparse or no probe data. By way of example, the inference can be the actual most probable lane(s) a probe or probe trajectory traversed along the road link or the strand.

In step 1109, the communication module 903 can provide the detected lane closure as an output. In one instance, the output can comprise a user interface (e.g., a navigation application 115) of a UE 113 (e.g., a mobile device, an embedded navigation system, etc.) that can help a user potentially avoid congestion and/or delay while driving on the road segment or link that the analysis module 909 detected the lane closure. In one embodiment, the output can comprise instructions, data, one or more signals, or a combination thereof for providing vehicles 101 (e.g., autonomous vehicles) guidance or navigation on the road segment or link that the analysis module 909 detected the lane closure to enable the vehicles 101 to potentially minimize congestion and/or delay. In one instance, the output can be used by a user (e.g., a software developer or a city planner) to assess the accuracy of the lane closure detection and/or the lane closure verification to determine whether any updates are needed with respect to the shift distance threshold, the threshold values (e.g., respective magnitude and/or direction values), or a combination thereof.

In one embodiment, the training module 911 in connection with the machine learning system 121 can perform the spatial clustering of the probe data with respect to a longitudinal axis of the road link as part of the lane closure detection process in step 1103 and/or can process the respective cluster shifts using the at least one HMM to detect the lane closure, the lane shift, or a combination thereof across the strand in step 1107. In one embodiment, the training module 911 can train the machine learning system 121 to select or assign respective weights, correlations, relationships, etc. among the factors and/or inputs used to generate the lane closure and lane shift metrics (e.g., a k-means clustering algorithm to inspect the data), to make an inference and to elicit the most likely sequence of "hidden" states across the strand (e.g., using the Viterbi algorithm), or a combination thereof.

In one embodiment, the training module 911 can continuously provide and/or update a machine learning model (e.g., a support vector machine (SVM), a neural network, a decision tree, etc.) of the machine learning system 121 during training using, for instance, supervised deep convolution networks or equivalents. In other words, the training module 911 can train a machine learning module using the respective weights of the received probe data, the historical probe data, ground truth data, etc. to efficiently determine a cluster shift, a lane closure, a lane shift, or a combination thereof on the road link, the strand, or a combination thereof with low latency. By way of example, the training module 911 can train the machine learning system 121 to apply more weight to more recent historical probe data or more recent ground truth data compared to relatively older historical probe data that may no longer be accurate and/or may be stale.

In one instance, the machine learning system 121 can improve the machine learning models using feedback loops based on, for example, the comparison of a detected lane closure and the subsequent verification of the lane closure. In one embodiment, the machine learning system 121 can improve the machine learning models using ground truth data (e.g., collected by field personnel and/or human observation) as training data. For example, the machine learning system 121 can analyze the detected and/or verified lane closure values that fall within a certain threshold or tolerance or actual lane closures to determine the performance of the machine learning models.

In one embodiment, the training data can include ground truth data taken from relatively recent historical spatial clustering and/or historical probe data (e.g., provided by humans monitoring traffic). For instance, in a data mining process, features are mapped by the training module 911 to ground truth lane closures and/or lane shifts to form a training instance. A plurality of training instances can form the training data for the machine learning system 121 using one or more machine learning algorithms (e.g., random forest, decision trees, etc.). For instance, the training data can be split into a training set and a test set (e.g., at a ratio of 7:3). After evaluating several machine learning models based on the training set and the test set, the machine learning system 121 can determine the machine learning model that produces the highest classification accuracy in training and testing to use as the lane closure detection and/or lane closure verification machine learning model.

Figure 12A:
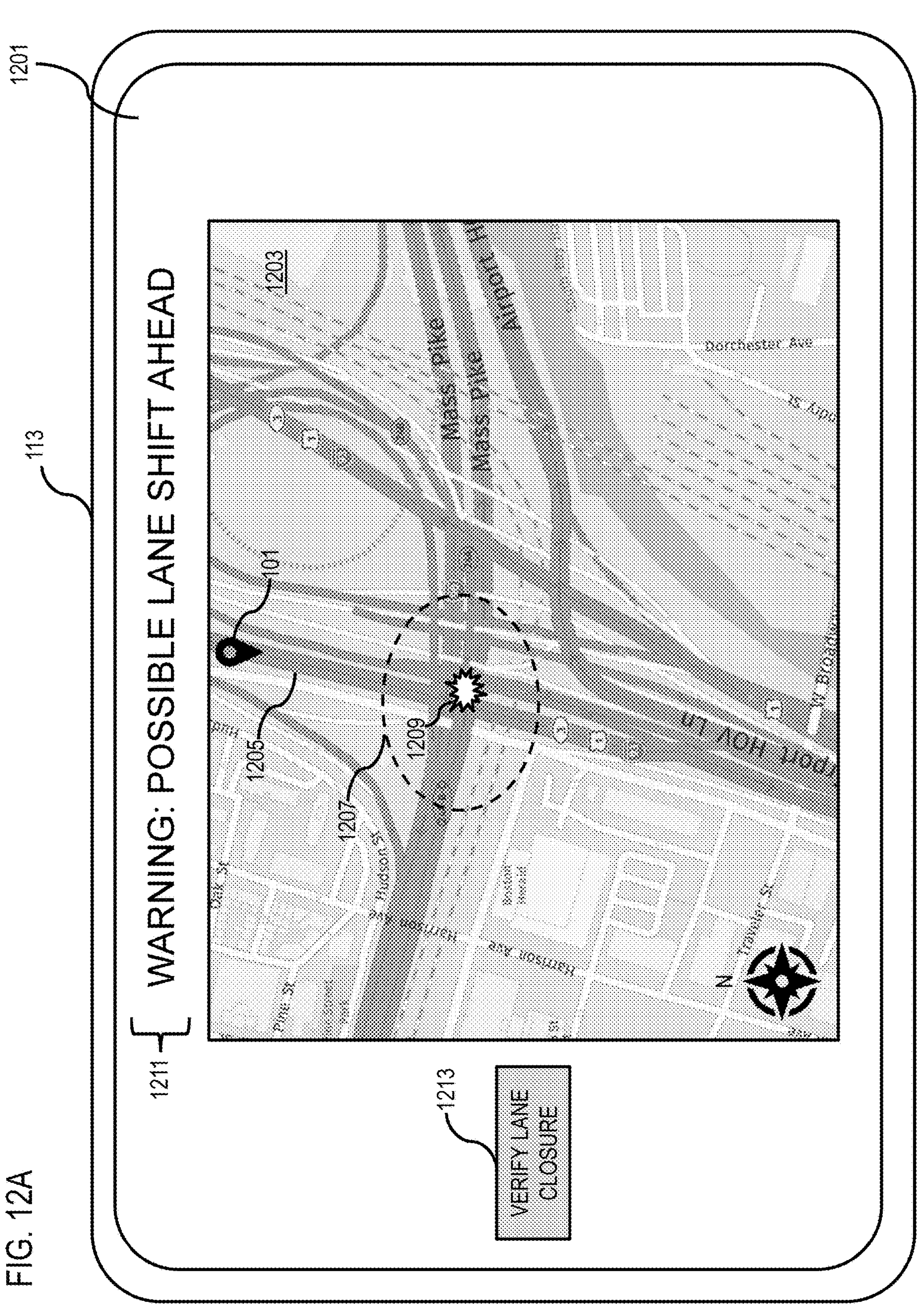
FIGS. 12A through 12C are diagrams of example user interfaces capable of verifying a lane closure using probe data, according to example embodiment(s)
Figure 12B:
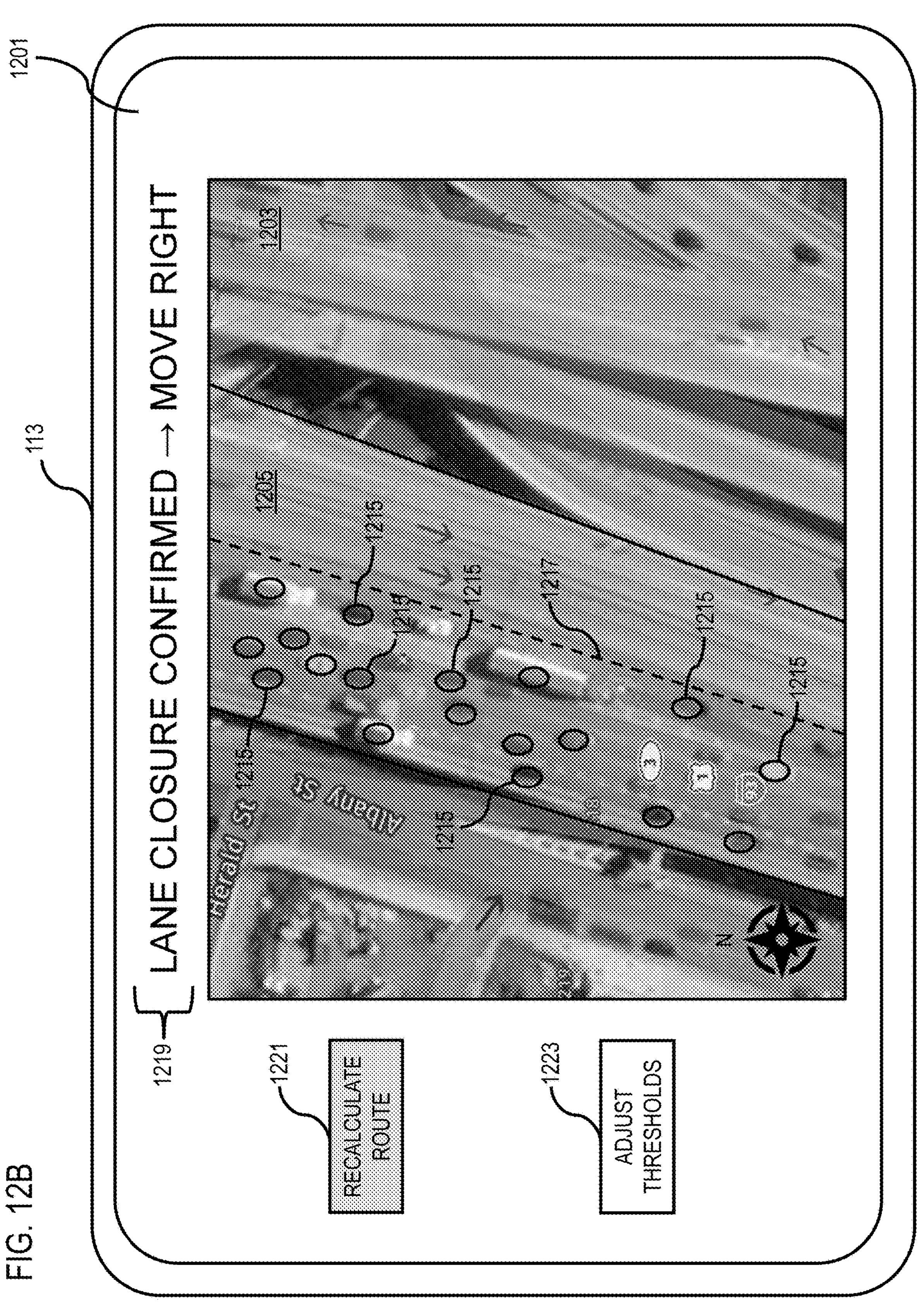
Figure 12C:
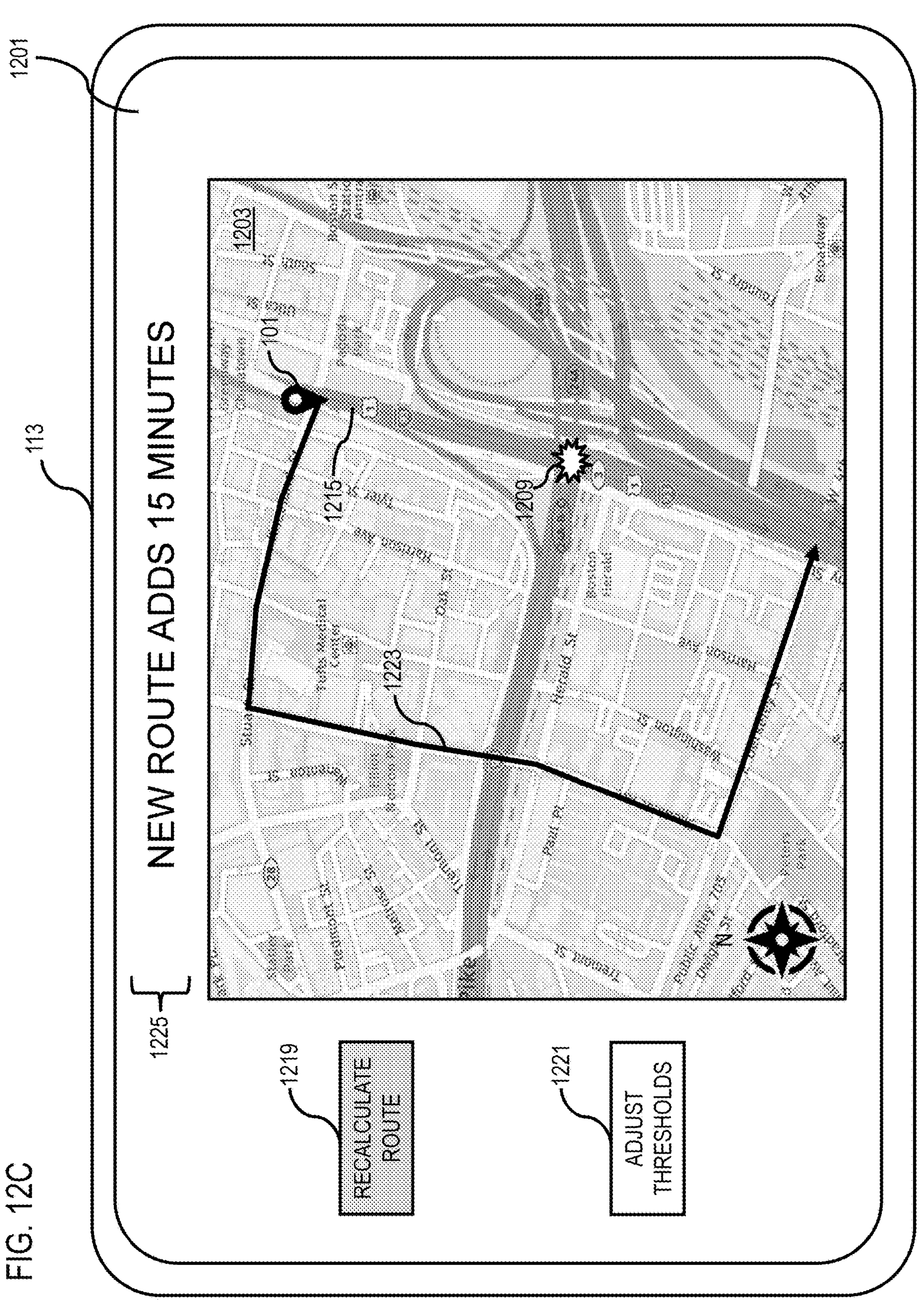

FIGS. 12A through 12C are diagrams of example user interfaces capable of verifying a lane closure using probe data, according to example embodiment(s). In one embodiment, the system 100 can generate a user interface (UI) 1201 (e.g., a navigation application 115) of a UE 113 (e.g., a mobile device, a smartphone, an embedded navigation system, etc.) that can enable a user (e.g., a driver or a passenger) of a vehicle 101 to detect and/or to verify a lane closure in real-time using probe data, according to the various embodiment described herein. For example, a driver of a standard vehicle 101 may want guidance to know the magnitude and/or the location of a traffic event to potentially minimize the disruption to her travel along a given road segment or a strand (e.g., a large interstate highway). By way of example, a temporary event (e.g., a minor accident) may represent one end of the magnitude spectrum and a semi-permanent event (e.g., planned roadwork or construction) may represent the opposite end of the magnitude spectrum. In another example, a passenger of an autonomous vehicle 101 may want to know the magnitude and/or the location of a traffic event to get confirmation (e.g., to ease her anxiety) that the vehicle 101 that she is riding in is aware of the upstream disruption and is taking sufficient steps to minimize any delay (e.g., making timely lane changes). In this example, a user is driving a standard vehicle 101 on a multi-lane highway to leave a major metropolitan city (e.g., Boston) at a time in which both vehicle accidents and planned roadwork or construction have been known to occur on the road or link that the user is traveling.

Referring to FIG. 12A, in one embodiment, the system 100 can generate the UI 1201 such that it includes a digital map 1203 (e.g., a portion of the digital map 111) that shows the vehicle 101 and the user (e.g., based on real-time probe data) traveling southbound on a multi-lane highway 1205, which includes multiple complex interchanges in the area 1207 (e.g., such interchanges are often areas affected by lane changes, lane closures, etc.). In one instance, the system 100 can determine that a traffic event 1209 was recently reported (e.g., based on crowdsourced information, humans monitoring traffic, etc.) at or about the interchange 1207, which depending on its magnitude and location on the route 1205 may cause the user significant delay and/or make changing one or more lanes relatively more difficult (e.g., producing user unease and/or anxiety). In one instance, the system 100 can generate the UI 1201 such that it can provide a user with a timely notification 1211 of a determined potential route or lane change state (e.g., "Warning: Possible Lane Shift Ahead").

In one embodiment, the system 100 can generate the UI 1201 such that it includes an input 1213 (e.g., "Verify Lane Closure") to enable a user to determine whether the possible lane shift is of the magnitude that it represents a temporary event (e.g., debris on the road) and, therefore, is unlikely to require the user to change lanes or whether the possible lane shift is of the magnitude that it represents a more permanent lane closure (e.g., planned or unplanned) that will likely require the user to change lanes well in advance of the lane closure to avoid substantial delay. In this example, the user has selected to verify the lane closure based on one or more interactions with the input 1213, as depicted by the shaded color of the input 1213.

In one instance, the one or more user interactions may include one or more physical interactions (e.g., a touch, a tap, a gesture, typing, etc.), one or more voice commands, or a combination thereof. In one instance, the system 100 can generate the UI 1201 such that it can provide a user with one or more audio cues or audible feedback in response to one or more user interactions. In one embodiment, the system 100 can generate all the inputs described with respect to FIGS. 12A-12C such that they all have the same functionality in terms of user interaction/operability.

Referring to FIG. 12B, in one embodiment, the system 100 can determine (e.g., using k-means clustering) based on the lane closure metric and the lane shift metric associated with route 1205 at this time that the number of probes 1215 and corresponding clusters is such that one or more lanes of the route 1205 are likely closed and that their position relative to the longitudinal axis 1217 suggests that the one or more closed lanes are on the left side of the route 1205 from the perspective of the flow of the traffic (e.g., southbound). In one instance, the system 100 can generate the UI 1201 such that it provides the user with a notification 1219 (e.g., "Lane Closure Confirm→Move Right"). In one embodiment, the system 100 can generate the UI 1201 such that it includes an input 1221 (e.g., "Recalculate Route") and an input 1223 (e.g., "Adjust Thresholds") to enable one or more user-based adjustments to the system 100's route calculation.

In one embodiment, the system 100 can recalculate a route, as depicted in FIG. 12C, based on the system 100 using the lane closure metrics represented in FIG. 12B at the link level to make sense of the event on an entire road segment or strand (e.g., using HMM). In other words, once the system 100 detects the lane closure event at the link level and produces the lane closure metrics and lane shift metrics, the system 100 can verify the determination (e.g., using the HMM algorithm) across a stand of links. For example, the verification across the strand by the system 100 can assist the user to decide whether to shift lanes to the right or whether to request that the system 100 recalculate the route to find one or more suitable alternatives (e.g., route 1223). In one instance, the system 100 can generate the UI 1201 such that it can provide the user with a notification 1225 to inform the user as to how much time she will save or lose by taking the recalculated route (e.g., "New Route Adds 15 Minutes).

In one embodiment, unlike in this example, where the clustering may not be as pronounced in terms of magnitude and shift, a user (e.g., a driver, a software engineer, etc.) can use the input 1221 (e.g., "Adjust Threshold") to modify or change the shift distance threshold, the threshold values (e.g., respective magnitude and direction values), or a combination thereof to cause the system 100 to recalculate the lane closure metrics to determine whether the system 100 still concludes a lane closure and/or a lane closure is occurring on a given lane. In one embodiment, the system 100 can generate the UI 1201 such that a user can also adjust one or more parameters used by the system 100 to recalculate a route (e.g., cost, time, distance, toll road, etc.), one or more threshold parameters used to determine a lane closure, a lane shift, or a combination thereof (e.g., x, 0, etc.), or a combination thereof to ensure that the system 100 can detect and can verify a lane closure with confidence and low latency.

Returning to FIG. 1, in one embodiment, the mapping platform 103 has connectivity over the communication network 105 to the services platform 123 (e.g., an OEM platform) that provides one or more services 125*a*-125*n* (also collectivity referred to as services 125) (e.g., probe or sensor data collection services). By way of example, the services 125 may also be other third-party services and include mapping services, navigation services, travel planning services, notification services, social networking services, content provisioning services (e.g., audio, video, images, etc.), application services, storage services, contextual information determination services, location-based services, information-based services (e.g., weather, news, etc.), etc. In one embodiment, the services platform 123 uses the output (e.g., lane closure verification) to provide services such as navigation, mapping, other location-based services (e.g., traffic incident reporting), etc.

In one embodiment, the mapping platform 103 may be a platform with multiple interconnected components and may include multiple servers, intelligent networking devices, computing devices, components, and corresponding software for verifying a lane closure using probe data. In addition, it is noted that the mapping platform 103 may be a separate entity of the system 100, a part of the one or more services 125, a part of the services platform 123, or included within the vehicles 101 (e.g., an embedded navigation system).

In one embodiment, content providers 127*a*-127*m* (also collectively referred to as content providers 127) may provide content or data (e.g., including geographic data, sensor data, historic sensor or probe data, etc.) to the vehicles 101, the mapping platform 103, the UEs 113, the applications 115, the probe database 117, the geographic database 119, the machine learning system 121, the services platform 123, and the services 125. The content provided may be any type of content, such as map content, textual content, audio content, video content, image content, etc. In one embodiment, the content providers 127 may provide content that may aid in localizing a vehicle 101 on a lane of a road segment, link, and/or strand of a digital map (e.g., lanes 109*a*-109*n* of the digital map 111). In one embodiment, the content providers 127 may also store content associated with the vehicles 101, the mapping platform 103, the probe database 117, the geographic database 119, the machine learning system 121, the services platform 123, and/or the services 125. In another embodiment, the content providers 127 may manage access to a central repository of data, and offer a consistent, standard interface to data, such as a repository of the probe database 117, the geographic database 119, or a combination thereof.

By way of example, the UEs 113 can be any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, devices associated with one or more vehicles or any combination thereof, including the accessories and peripherals of these devices, or any combination thereof. It is also contemplated that a UE 113 can support any type of interface to the user (such as "wearable" circuitry, etc.). Also, the UEs 113 may be configured to access the communication network 105 by way of any known or still developing communication protocols. In one embodiment, the UEs 113 may include the mapping platform 103 to verify a lane closure using probe data.

In one embodiment, the vehicles 101 can include the vehicle sensors 107 for generating, collecting vehicular sensor data, related geographic/map data, etc. In one embodiment, the sensed data represents sensor data associated with a geographic location or coordinates at which the sensor data was collected. In one embodiment, the probe data (e.g., stored in the probe database 117) includes location probes collected by one or more vehicle sensors 107. In this way, the sensor data can act as observation data that can be aggregated into location-aware training and evaluation data sets (e.g., an artifact or input) for use by the machine learning system 121. By way of example, the vehicle sensors 107 may include a RADAR system, a LiDAR system, a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data, an audio recorder for gathering audio data, velocity sensors mounted on a steering wheel of the vehicles 101, switch sensors for determining whether one or more vehicle switches are engaged, and the like. Though depicted as automobiles, it is contemplated the vehicles 101 can be any type of manned or unmanned, public, private and/or shared vehicle (e.g., cars, trucks, buses, vans, motorcycles, scooters, drones, etc.) that can travel on roads or links of a given area (e.g., link 109 of the digital map 111).

Other examples of vehicle sensors 107 may include light sensors, orientation sensors augmented with height sensors and acceleration sensor (e.g., an accelerometer can measure acceleration and can be used to determine orientation of the vehicle), tilt sensors to detect the degree of incline or decline of the vehicle 101 along a path of travel, moisture sensors, pressure sensors, etc. In a further example embodiment, vehicles sensors 107 about the perimeter of the vehicle 101 may detect the relative distance of the vehicle 101 from a longitudinal axis (e.g., a center vector line, y-axis, etc.), a physical divider, a lane line of a link or a roadway, the presence of other vehicles 101, pedestrians, traffic lights, potholes and any other objects, or a combination thereof. In one scenario, the vehicle sensors 107 may detect weather data, traffic information, or a combination thereof. In one embodiment, the vehicles 101 may include vehicle sensors 107 such as GPS or other satellite-based receivers to obtain geographic coordinates from the one or more satellites 129 for determining current location and time. Further, a vehicle location within an area can be determined by visual odometry, triangulation systems such as A-GPS, Cell of Origin, or other location extrapolation technologies when cellular or network signals are available.

In one embodiment, the UEs 113 may also be configured with various sensors (not shown for illustrative convenience) for acquiring and/or generating probe data associated with a vehicle 101, an individual (e.g., a user, a driver, a passenger, etc.), or a combination thereof traveling on a road segment or link, other vehicles 101, conditions regarding the driving environment or roadway (e.g., affecting link 109, the area corresponding to the digital map 111, etc.), etc. For example, such sensors may be used as GPS receivers for interacting with the one or more satellites 129 to determine and track the current speed, position, and location of a vehicle 101 (e.g., travelling along a link or roadway). In addition, the sensors may gather tilt data (e.g., a degree of incline or decline of the vehicle 101 during travel), motion data, light data, sound data, image data, weather data, temporal data and other data associated with the vehicles 101 and/or the UEs 113. Still further, the sensors may detect local or transient network and/or wireless signals, such as those transmitted by nearby devices (UEs 113) during navigation of a vehicle 101 along a roadway (Li-Fi, near field communication (NFC)), etc.

It is noted therefore that the above-described data may be transmitted via the communication network 105 as probe data (e.g., GPS probe data) according to any known wireless communication protocols. For example, each vehicle 101, UE 113, application 115, and/or user, may be assigned a unique probe identifier (probe ID) for use in reporting or transmitting said probe data collected by the vehicles 101 and/or UEs 113. In one embodiment, each vehicle 101 and/or UE 113 is configured to report probe data as probe points, which are individual data records collected at a point in time that records telemetry data. Probes or probe points can be collected by the system 100 from the vehicles 101, UEs 113, applications 115, and/or the probe database 117 in real-time, in batches, continuously, or at any other frequency requested by the system 100 over, for instance, the communication network 105 for processing by the mapping platform 103, the machine learning system 121, or a combination thereof.

In one embodiment, the mapping platform 103 retrieves aggregated probe points gathered and/or generated by the UEs 113 resulting from the travel of the UEs 113 and/or vehicles 101 on a road segment (e.g., link 109) associated with a given area (e.g., the area corresponding to the digital map 111). In one instance, the probe database 117 stores a plurality of probe points and/or trajectories generated by different vehicles 101, UEs 113, applications 115, etc. over a period while traveling in a monitored area (e.g., the area of the digital map 111). A time sequence of probe points specifies a trajectory—i.e., a path traversed by a vehicle 101, UE 113, application 115, etc. over the period.

In one embodiment, the communication network 105 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the vehicles 101, the mapping platform 103, the UEs 113, the application 115, the services platform 123, the services 125, the content providers 127, and/or the one or more satellites 129 communicate with each other and other components of the system 100 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 13:
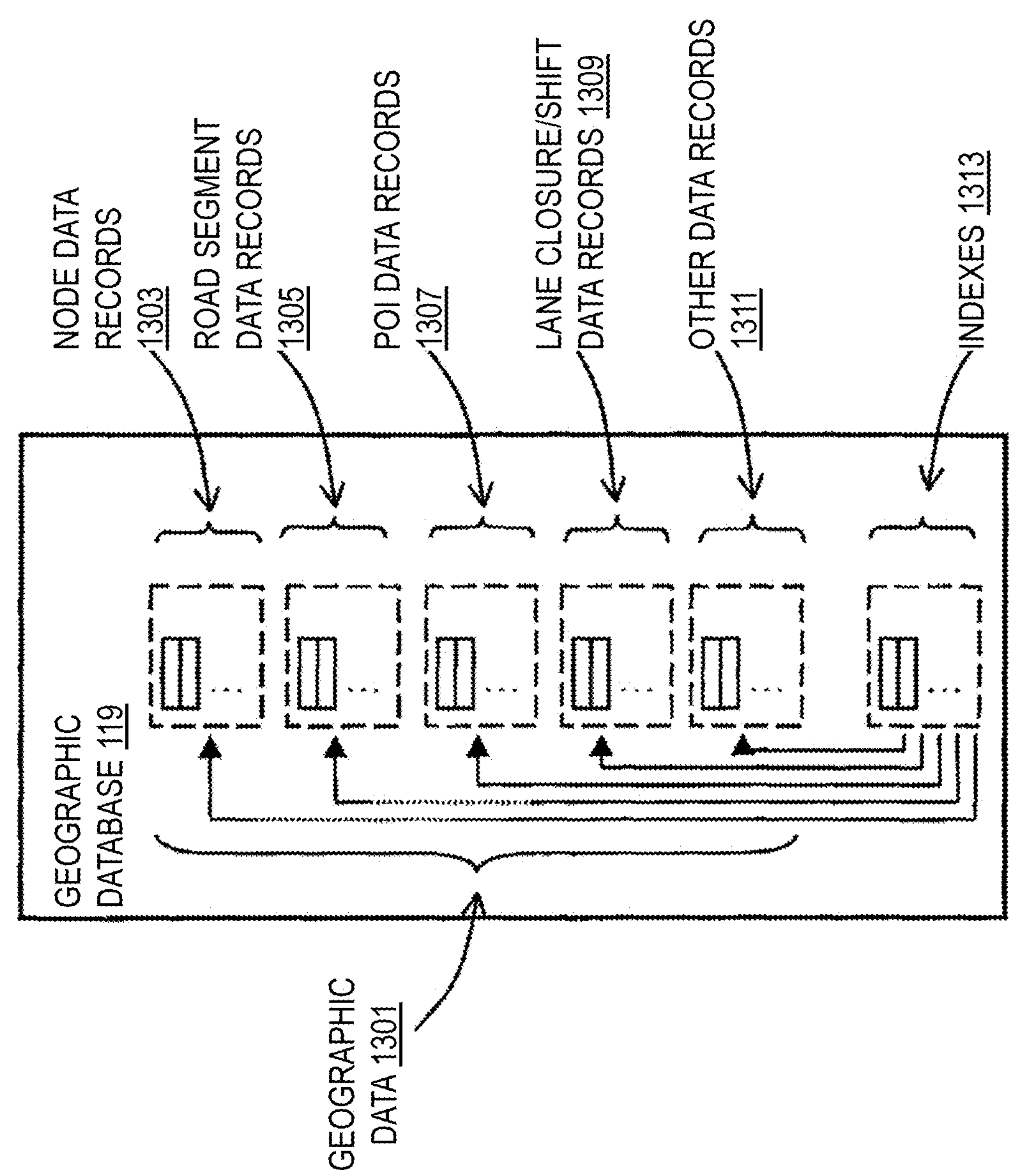
FIG. 13 is a diagram of a geographic database, according to example embodiment(s)

FIG. 13 is a diagram of a geographic database, according to example embodiment(s). In one embodiment, the geographic database 119 includes geographic data 1301 used for (or configured to be compiled to be used for) verifying a lane closure using probe data. In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 119.

"Node"—A point that terminates a link.

"Line segment"—A straight line connecting two points.

"Link" (or "edge")—A contiguous, non-branching string of one or more-line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon (e.g., a hexagon) is constructed from one outer simple polygon and none or at least one inner simple polygon. A polygon is simple if it just consists of one simple polygon, or complex if it has at least one inner simple polygon.

In one embodiment, the geographic database 119 follows certain conventions. For example, links do not cross themselves and do not cross each other except at a node. Also, there are no duplicated shape points, nodes, or links. Two links that connect each other have a common node. In the geographic database 119, overlapping geographic features are represented by overlapping polygons. When polygons overlap, the boundary of one polygon crosses the boundary of the other polygon. In the geographic database 119, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

As shown, the geographic database 119 includes node data records 1303, road segment or link data records 1305, POI data records 1307, lane closure/shift data records 1309, other records 1311, and indexes 1313, for example. More, fewer, or different data records can be provided. In one embodiment, additional data records (not shown) can include cartographic ("carto") data records, routing data, and maneuver data. In one embodiment, the indexes 1313 may improve the speed of data retrieval operations in the geographic database 119. In one embodiment, the indexes 1313 may be used to quickly locate data without having to search every row in the geographic database 119 every time it is accessed. For example, in one embodiment, the indexes 1313 can be a spatial index of the polygon points associated with stored feature polygons.

In exemplary embodiments, the road segment data records 1305 are links or segments representing roads, streets, or paths (e.g., that are unique to an area) that can be used for verifying a lane closure using probe data. The node data records 1303 are end points corresponding to the respective links or segments of the road segment data records 1305. The road link data records 1305 and the node data records 1303 represent a road network (e.g., a link 109), such as used by vehicles 101 and/or other entities. Alternatively, the geographic database 119 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as a restaurant, a retail shop, an office, etc. The geographic database 119 can include data about the POIs and their respective locations in the POI data records 1307. In one embodiment, the POI data records 1307 can include population density data, hours of operation, popularity or preference data, prices, ratings, reviews, and various other attributes. The geographic database 119 can also include data about places, such as cities, towns, or other communities, and other geographic features, such as bodies of water, mountain ranges, etc. Such place or feature data can be part of the POI data records 1307 or can be associated with POIs or POI data records 1307 (such as a data point used for displaying or representing a portion of a city).

In one embodiment, the geographic database 119 includes lane closure/shift data records 1309 (i.e., lane metrics) associated with lane closure metrics and/or lane shift metrics, which are the estimate or measure of the degree or likelihood to which lane(s) of a link (e.g., link 109) are closed and which side of the road the closure happened. In one embodiment, the geographic database 119 can include lane closure/shift data (e.g., probe data) collected from vehicles 101 (e.g., probes), UEs 113, or a combination thereof. As previously discussed, the lane closure/shift data can include probe points collected from the vehicles 101, the UEs 113, or a combination thereof and include telemetry data that can be used to indicate probe point locations on a road segment or a link from which the probe data was collected. In one embodiment, the lane closure/shift data can be map-matched to the road segment or link (e.g., link 109) and stored in the probe database 117, the geographic database 119, or a combination thereof. In one embodiment, the lane closure/shift data can be further map-matched to individual lanes of a road segment or link or a strand for subsequent processing according to the various embodiments described herein. By way of example, the map matching can be performed by matching the geographic coordinates (e.g., latitude and longitude) recorded for a probe-point against a roadway or lane within a multi-lane roadway corresponding to the coordinates.

In one embodiment, as described above, the system 100 (e.g., using an BIMINI algorithm) can make sense of the lane closure/shift data records 1309 from across a strand of road by exploiting the spatial connectivity of the links and their contiguity to derive the most likely state of each link in the strand (e.g., links 109, 505, 507, etc.) given a more robust estimate/prediction of the lane-closure and lane-shift on the entire strand. In one embodiment, the lane closure/shift data records 1309 are converted by the system 100 to emission probabilities of the BIMINI, the domain (human) knowledge is inputted to the transition probabilities, and the Viterbi algorithm can be used by the system 100 (e.g., by the machine learning system 121) to make an inference and to elicit the most likely sequence of "hidden" states across the strand even when some links have sport or no probe data. In one instance, the lane closure/shift data records 1309 can include historical spatial clusters and/or historical probe data for one or road segments or links for a given area (e.g., the area corresponding to the digital map 111). In one instance, the lane closure/shift data records 1309 can include rankings, weights, or weighting schemes, labeled and/or marked features and attributes (e.g., for use in connection with the machine learning system 121), and/or any other related data. In one embodiment, the lane closure/shift data records 1309 can be associated with one or more of the node data records 1303, road segment or link records 1305, and/or POI data records 1307; or portions thereof (e.g., smaller or different segments than indicated in the road segment records 1305) to verify a lane closure using probe data.

In one embodiment, the geographic database 119 can be maintained by the services platform 123 (e.g., a map developer). The map developer can collect human movement data to generate and enhance the geographic database 119. There can be different ways used by the map developer to collect data. These ways can include obtaining data from other sources, such as municipalities or respective geographic authorities, humans monitoring traffic, crowdsources, etc. In addition, the map developer can employ field personnel to travel by a vehicle 101 along one or more roads throughout an area of interest (e.g., the link 109 of the digital map 111) to observe and/or record probe trajectory data (e.g., speed, distance {d}, etc.). Similarly, the map developer can employ field personnel to travel by foot throughout an area of interest (e.g., the area corresponding to the digital map 111) to observe or catalogue lane closure information (e.g., ground truth data). Also, remote sensing, such as aerial or satellite photography, can be used.

In one embodiment, the geographic database 119 include high resolution or high definition (HD) mapping data that provide centimeter-level or better accuracy of map features. For example, the geographic database 119 can be based on LiDAR or equivalent technology to collect billions of 3D points and model road surfaces and other map features down to the number lanes and their widths. In one embodiment, the HD mapping data capture and store details such as the slope and curvature of the road, lane markings, roadside objects such as signposts, including what the signage denotes. By way of example, the HD mapping data enable highly automated vehicles 101 (e.g., autonomous vehicles, drones, HAD vehicles, semi-autonomous vehicles, etc.) to precisely localize themselves on a road (e.g., link 109), and to determine the road attributes (e.g., direction of traffic) at high accuracy levels.

In one embodiment, the geographic database 119 is stored as a hierarchical or multilevel tile-based projection or structure. More specifically, in one embodiment, the geographic database 119 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

The geographic database 119 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle 101, a vehicle sensor 107, and/or a UE 113. The navigation-related functions can correspond to vehicle navigation (e.g., autonomous navigation), pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for verifying a lane closure using probe data may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 14:
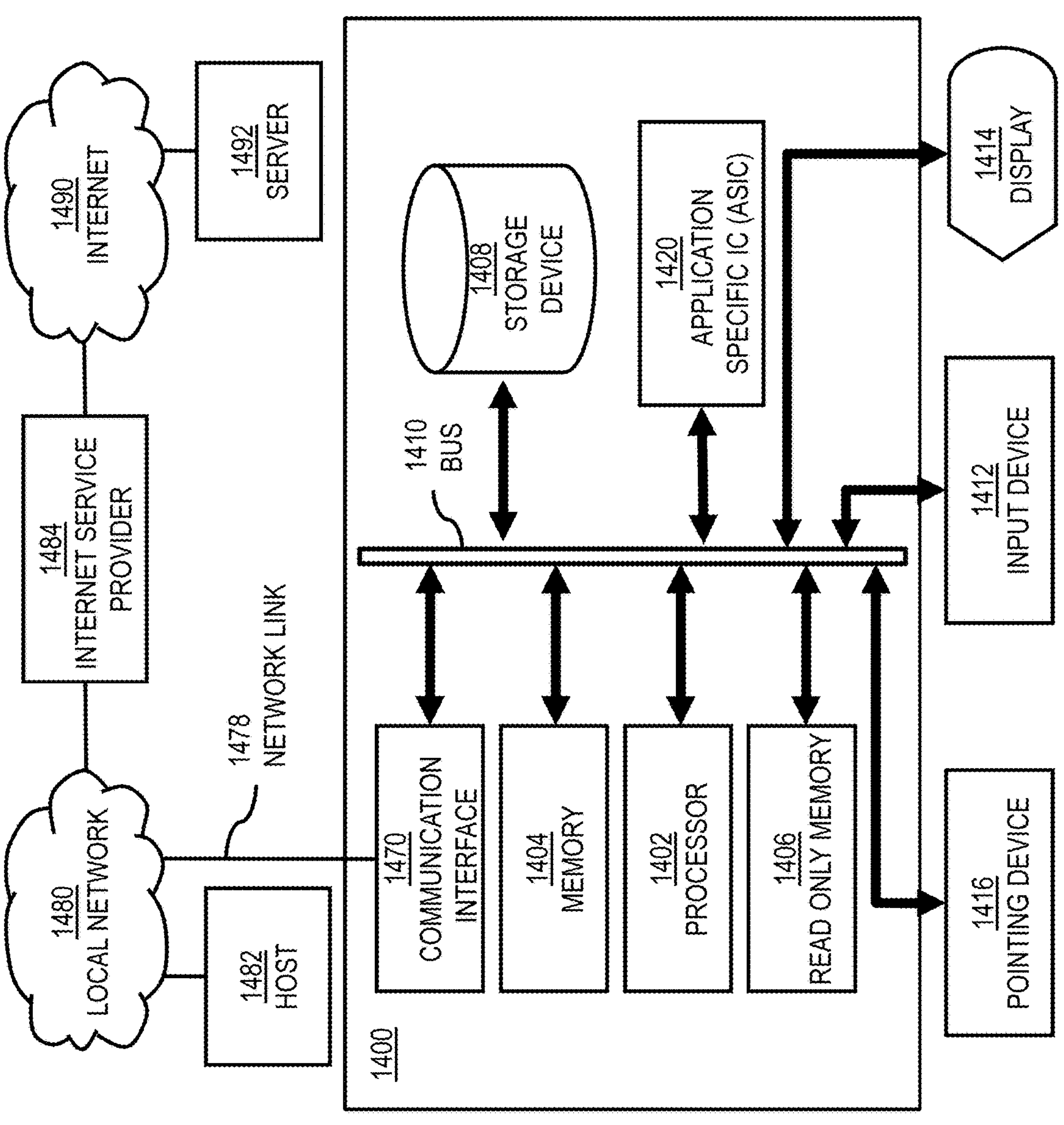
FIG. 14 is a diagram of hardware that can be used to implement example embodiment(s)

FIG. 14 illustrates a computer system 1400 upon which example embodiment(s) of the invention may be implemented. Computer system 1400 is programmed (e.g., via computer program code or instructions) to verify a lane closure using probe data as described herein and includes a communication mechanism such as a bus 1410 for passing information between other internal and external components of the computer system 1400. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1410 includes one or more parallel conductors of information so that information is transferred quickly among devices coupled to the bus 1410. One or more processors 1402 for processing information are coupled with the bus 1410.

A processor 1402 performs a set of operations on information as specified by computer program code related to verifying a lane closure using probe data. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1410 and placing information on the bus 1410. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1402, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1400 also includes a memory 1404 coupled to bus 1410. The memory 1404, such as a random-access memory (RAM) or other dynamic storage device, stores information including processor instructions for verifying a lane closure using probe data. Dynamic memory allows information stored therein to be changed by the computer system 1400. RAM allows a unit of information stored at a location called a memory address to be stored and retrieved independently of information at neighboring addresses. The memory 1404 is also used by the processor 1402 to store temporary values during execution of processor instructions. The computer system 1400 also includes a read only memory (ROM) 1406 or other static storage device coupled to the bus 1410 for storing static information, including instructions, that is not changed by the computer system 1400. Some memory is composed of volatile storage that loses the information stored thereon when power is lost. Also coupled to bus 1410 is a non-volatile (persistent) storage device 1408, such as a magnetic disk, optical disk, or flash card, for storing information, including instructions, that persists even when the computer system 1400 is turned off or otherwise loses power.

Information, including instructions for verifying a lane closure using probe data, is provided to the bus 1410 for use by the processor from an external input device 1412, such as a keyboard containing alphanumeric keys operated by a human user, or a sensor. A sensor detects conditions in its vicinity and transforms those detections into physical expression compatible with the measurable phenomenon used to represent information in computer system 1400. Other external devices coupled to bus 1410, used primarily for interacting with humans, include a display device 1414, such as a cathode ray tube (CRT) or a liquid crystal display (LCD), or plasma screen or printer for presenting text or images, and a pointing device 1416, such as a mouse or a trackball or cursor direction keys, or motion sensor, for controlling a position of a small cursor image presented on the display 1414 and issuing commands associated with graphical elements presented on the display 1414. In some embodiments, for example, in embodiments in which the computer system 1400 performs all functions automatically without human input, one or more of external input device 1412, display device 1414 and pointing device 1416 is omitted.

In the illustrated embodiment, special purpose hardware, such as an application specific integrated circuit (ASIC) 1420, is coupled to bus 1410. The special purpose hardware is configured to perform operations not performed by processor 1402 quickly enough for special purposes. Examples of application specific ICs include graphics accelerator cards for generating images for display 1414, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1400 also includes one or more instances of a communications interface 1470 coupled to bus 1410. Communication interface 1470 provides a one-way or two-way communication coupling to a variety of external devices that operate with their own processors, such as printers, scanners, and external disks. In general, the coupling is with a network link 1478 that is connected to a local network 1480 to which a variety of external devices with their own processors are connected. For example, communication interface 1470 may be a parallel port or a serial port or a universal serial bus (USB) port on a personal computer. In some embodiments, communications interface 1470 is an integrated services digital network (ISDN) card or a digital subscriber line (DSL) card or a telephone modem that provides an information communication connection to a corresponding type of telephone line. In some embodiments, a communication interface 1470 is a cable modem that converts signals on bus 1410 into signals for a communication connection over a coaxial cable or into optical signals for a communication connection over a fiber optic cable. As another example, communications interface 1470 may be a local area network (LAN) card to provide a data communication connection to a compatible LAN, such as Ethernet. Wireless links may also be implemented. For wireless links, the communications interface 1470 sends or receives or both sends and receives electrical, acoustic, or electromagnetic signals, including infrared and optical signals, that carry information streams, such as digital data. For example, in wireless handheld devices, such as mobile telephones like cell phones, the communications interface 1470 includes a radio band electromagnetic transmitter and receiver called a radio transceiver. In certain embodiments, the communications interface 1470 enables connection to the communication network 105 for verifying a lane closure using probe data.

The term computer-readable medium is used herein to refer to any medium that participates in providing information to processor 1402, including instructions for execution. Such a medium may take many forms, including, but not limited to, non-volatile media, volatile media, and transmission media. Non-volatile media include, for example, optical or magnetic disks, such as storage device 1408. Volatile media include, for example, dynamic memory 1404. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization, or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Network link 1478 typically provides information communication using transmission media through one or more networks to other devices that use or process the information. For example, network link 1478 may provide a connection through local network 1480 to a host computer 1482 or to equipment 1484 operated by an Internet Service Provider (ISP). ISP equipment 1484 in turn provides data communication services through the public, world-wide packet-switching communication network of networks now commonly referred to as the Internet 1490.

A computer called a server host 1492 connected to the Internet hosts a process that provides a service in response to information received over the Internet. For example, server host 1492 hosts a process that provides information representing video data for presentation at display 1414. It is contemplated that the components of system can be deployed in various configurations within other computer systems, e.g., host 1482 and server 1492.

FIG. 15 illustrates a chip set 1500 upon which example embodiment(s) of the invention may be implemented. Chip set 1500 is programmed to verify a lane closure using probe data as described herein and includes, for instance, the processor and memory components described with respect to FIG. 14 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1500 includes a communication mechanism such as a bus 1501 for passing information among the components of the chip set 1500. A processor 1503 has connectivity to the bus 1501 to execute instructions and process information stored in, for example, a memory 1505. The processor 1503 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1503 may include one or more microprocessors configured in tandem via the bus 1501 to enable independent execution of instructions, pipelining, and multithreading. The processor 1503 may also be accompanied with one or more specialized components to perform certain processing functions and tasks such as one or more digital signal processors (DSP) 1507, or one or more application-specific integrated circuits (ASIC) 1509. A DSP 1507 typically is configured to process real-world signals (e.g., sound) in real time independently of the processor 1503. Similarly, an ASIC 1509 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1503 and accompanying components have connectivity to the memory 1505 via the bus 1501. The memory 1505 includes both dynamic memory (e.g., RAM, magnetic disk, writable optical disk, etc.) and static memory (e.g., ROM, CD-ROM, etc.) for storing executable instructions that when executed perform the inventive steps described herein to verify a lane closure using probe data. The memory 1505 also stores the data associated with or generated by the execution of the inventive steps.

Figure 16:
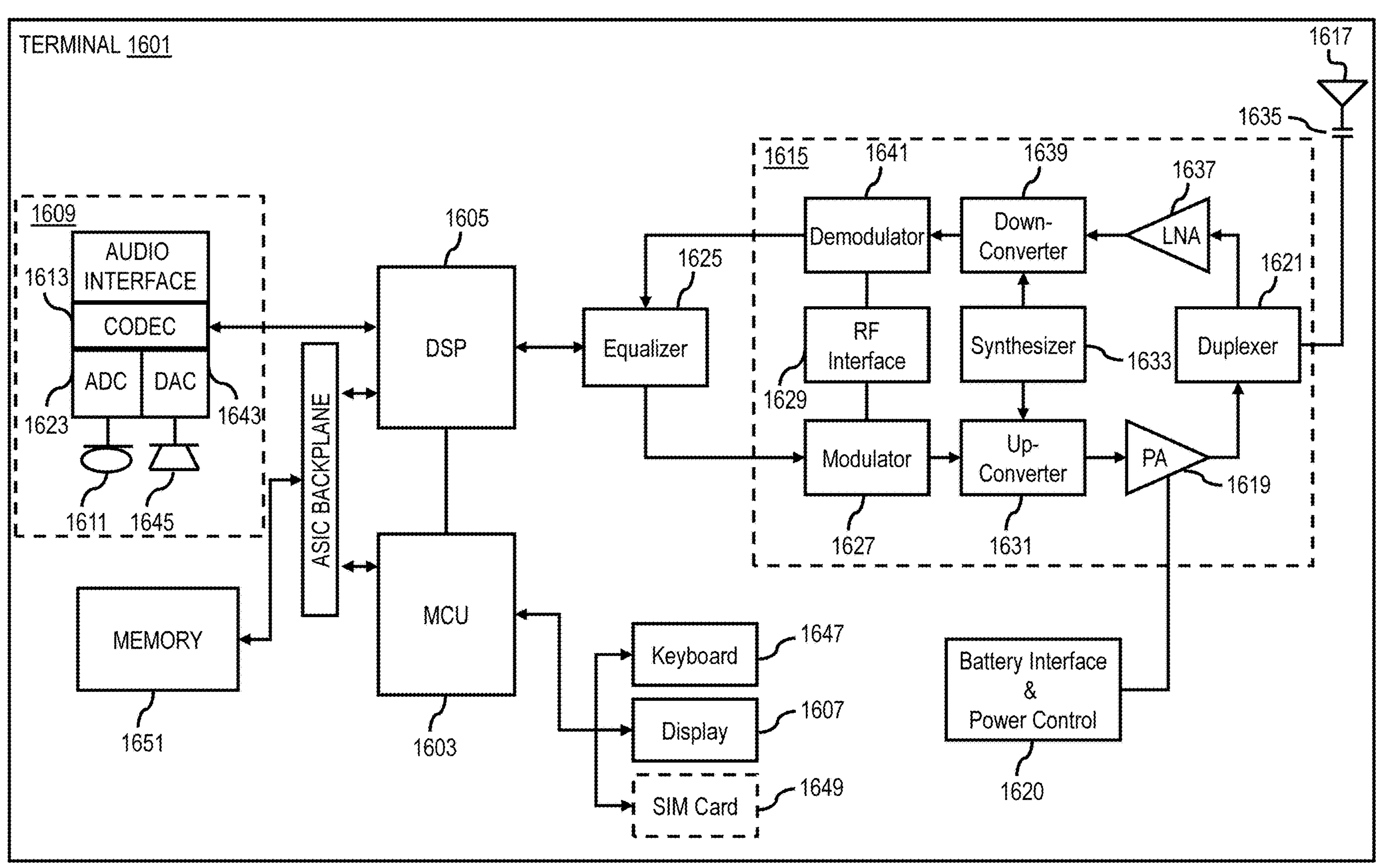
FIG. 16 is a diagram of a mobile terminal (e.g., handset or vehicle or part thereof) that can be used to implement example embodiment(s).

FIG. 16 is a diagram of exemplary components of a mobile terminal 1601 (e.g., a UE 113, a vehicle 101, or a component thereof) capable of operating in the system of FIG. 1, according to example embodiment(s). Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1603, a Digital Signal Processor (DSP) 1605, and a receiver/transmitter unit including a microphone gain control unit and a speaker gain control unit. A main display unit 1607 provides a display to the user in support of various applications and mobile station functions that offer automatic contact matching. An audio function circuitry 1609 includes a microphone 1611 and microphone amplifier that amplifies the speech signal output from the microphone 1611. The amplified speech signal output from the microphone 1611 is fed to a coder/decoder (CODEC) 1613.

A radio section 1615 amplifies power and converts frequency to communicate with a base station, which is included in a mobile communication system, via antenna 1617. The power amplifier (PA) 1619 and the transmitter/modulation circuitry are operationally responsive to the MCU 1603, with an output from the PA 1619 coupled to the duplexer 1621 or circulator or antenna switch, as known in the art. The PA 1619 also couples to a battery interface and power control unit 1620.

In use, a user of mobile station 1601 speaks into the microphone 1611 and his or her voice along with any detected background noise is converted into an analog voltage. The analog voltage is then converted into a digital signal through the Analog to Digital Converter (ADC) 1623. The control unit 1603 routes the digital signal into the DSP 1605 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UNITS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1625 for compensation of any frequency-dependent impairments that occur during transmission though the air such as phase and amplitude distortion. After equalizing the bit stream, the modulator 1627 combines the signal with a RF signal generated in the RF interface 1629. The modulator 1627 generates a sine wave by way of frequency or phase modulation. In order to prepare the signal for transmission, an up-converter 1631 combines the sine wave output from the modulator 1627 with another sine wave generated by a synthesizer 1633 to achieve the desired frequency of transmission. The signal is then sent through a PA 1619 to increase the signal to an appropriate power level. In practical systems, the PA 1619 acts as a variable gain amplifier whose gain is controlled by the DSP 1605 from information received from a network base station. The signal is then filtered within the duplexer 1621 and optionally sent to an antenna coupler 1635 to match impedances to provide maximum power transfer. Finally, the signal is transmitted via antenna 1617 to a local base station. An automatic gain control (AGC) can be supplied to control the gain of the final stages of the receiver. The signals may be forwarded from there to a remote telephone which may be another cellular telephone, other mobile phone or a landline connected to a Public Switched Telephone Network (PSTN), or other telephony networks.

Voice signals transmitted to the mobile station 1601 are received via antenna 1617 and immediately amplified by a low noise amplifier (LNA) 1637. A down-converter 1639 lowers the carrier frequency while the demodulator 1641 strips away the RF leaving only a digital bit stream. The signal then goes through the equalizer 1625 and is processed by the DSP 1605. A Digital to Analog Converter (DAC) 1643 converts the signal and the resulting output is transmitted to the user through the speaker 1645, all under control of a Main Control Unit (MCU) 1603—which can be implemented as a Central Processing Unit (CPU) (not shown).

The MCU 1603 receives various signals including input signals from the keyboard 1647. The keyboard 1647 and/or the MCU 1603 in combination with other user input components (e.g., the microphone 1611) comprise a user interface circuitry for managing user input. The MCU 1603 runs a user interface software to facilitate user control of at least some functions of the mobile station 1601 to verify a lane closure using probe data. The MCU 1603 also delivers a display command and a switch command to the display 1607 and to the speech output switching controller, respectively. Further, the MCU 1603 exchanges information with the DSP 1605 and can access an optionally incorporated SIM card 1649 and a memory 1651. In addition, the MCU 1603 executes various control functions required of the station. The DSP 1605 may, depending upon the implementation, perform any of a variety of conventional digital processing functions on the voice signals. Additionally, DSP 1605 determines the background noise level of the local environment from the signals detected by microphone 1611 and sets the gain of microphone 1611 to a level selected to compensate for the natural tendency of the user of the mobile station 1601.

The CODEC 1613 includes the ADC 1623 and DAC 1643. The memory 1651 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1651 may be, but not limited to, a single memory, CD, DVD, ROM, RAM, EEPROM, optical storage, or any other non-volatile or non-transitory storage medium capable of storing digital data.

An optionally incorporated SIM card 1649 carries, for instance, important information, such as the cellular phone number, the carrier supplying service, subscription details, and security information. The SIM card 1649 serves primarily to identify the mobile station 1601 on a radio network. The card 1649 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:

using one or more positioning sensors to collect probe data in real-time from one or more probe devices traveling a road link;

performing a spatial clustering of the probe data with respect to a longitudinal axis of the road link;

comparing the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering, wherein the probe data and the historical probe data include a plurality of location probes collected at respective points in time;

detecting, in real time, a lane closure on the road link based on determining that the cluster shift is greater than a shift distance threshold;

determining respective cluster shifts for a strand comprising the road link and at least one other connected road link; and detecting the lane closure, a lane shift, or a combination thereof for the strand based on the respective cluster shifts across the strand;

processing the respective cluster shifts using at least one Hidden Markov Model to detect the lane closure, the lane shift, or a combination thereof across the strand; and providing the detected lane closure as an output.

2. The method of claim 1, further comprising:

computing a lane closure metric based on the cluster shift, wherein the detecting of the lane closure is based on comparing the lane closure metric to another threshold value.

3. The method of claim 1, further comprising:

determining a direction of the cluster shift relative to the longitudinal axis of the road link, the direction being right or left; and determining a relative position of the lane closure on the road link based on the direction of the cluster shift.

4. The method of claim 3, further comprising:

computing a lane closure metric based on the cluster shift and the direction of the cluster shift, wherein the detecting of the lane closure is based on comparing the lane closure metric to another threshold value.

5. The method of claim 1, further comprising:

generating respective lane closure metrics for the road link and the at least one other connected road link of the strand; and converting the respective lane closure metrics to respective emission probabilities of the at least one Hidden Markov Model to detect the lane closure, the lane shift, or a combination thereof across the strand.

6. The method of claim 5, wherein the respective emission probabilities are based on respective likelihoods of a link lane closure and a side of a road of the link lane closure determined based on the lane closure metrics.

7. The method of claim 1, further comprising:

determining transition probability data between one or more states of the at least one Hidden Markov Model based on one or more connectivity attributes, one or more spatial attributes, or a combination thereof of the road link and the at least one other connected road link of the strand.

8. The method of claim 1, wherein the at least one Hidden Markov Model includes a first Hidden Markov Model for lane closure detection and a second Hidden Markov Model for lane shift detection.

9. An apparatus comprising:

at least one processor; and at least one memory including computer program code for one or more programs, the at least one memory and the computer program code configured to, with the at least one processor, cause the apparatus to perform at least the following operations:

use one or more positioning sensors to collect probe data in real-time from one or more probe devices traveling a road link;

perform a spatial clustering of the probe data with respect to a longitudinal axis of the road link;

compare the spatial clustering of the probe data to a historical spatial clustering of historical probe data of the road link to determine a cluster shift, wherein the cluster shift indicates that at least one cluster of the spatial clustering has shifted spatially to the left or the right relative to at least one other cluster of the historical clustering, wherein the probe data and the historical probe data include a plurality of location probes collected at respective points in time;

detect, in real-time, a lane closure on the road link based on determining that the cluster shift is greater than a shift distance threshold;

determine respective cluster shifts for a strand comprising the road link and at least one other connected road link; and detect the lane closure, a lane shift, or a combination thereof for the strand based on the respective cluster shifts across the strand;

process the respective cluster shifts using at least one Hidden Markov Model to detect the lane closure, the lane shift, or a combination thereof across the strand; and provide the detected lane closure as an output.

10. The apparatus of claim 9, wherein the apparatus is further caused to:

compute a lane closure metric based on the cluster shift, wherein the detecting of the lane closure is based on comparing the lane closure metric to another threshold value.

11. The apparatus of claim 9, wherein the apparatus is further caused to:

determine a direction of the cluster shift relative to the longitudinal axis of the road link, the direction being right or left; and determine a relative position of the lane closure on the road link based on the direction of the cluster shift.

12. The apparatus of claim 11, wherein the apparatus is further caused to:

compute a lane closure metric based on the cluster shift and the direction of the cluster shift, wherein the detecting of the lane closure is based on comparing the lane closure metric to another threshold value.

13. The apparatus of claim 9, wherein the at least one Hidden Markov Model includes a first Hidden Markov Model for lane closure detection and a second Hidden Markov Model for lane shift detection.

14. A non-transitory computer-readable storage medium having stored thereon one or more program instructions which, when executed by one or more processors, cause an apparatus to at least perform the following operations:

using one or more positioning sensors to collect probe data in real-time from one or more probe devices traveling a road link;

performing a spatial clustering of the probe data with respect to a longitudinal axis of the strand;

comparing the spatial clustering of the probe data to a historical spatial clustering of historical probe data of the strand to determine respective cluster shifts across the stand, wherein the respective cluster shifts indicate that at least one cluster of the spatial clustering has shifted spatially to the left or the right relative to at least one other cluster of the historical clustering, wherein the probe data and the historical probe data include a plurality of location probes collected at respective points in time;

detecting, in real time, a lane closure on the stand based on determining that the respective cluster shifts are greater than a shift distance threshold;

determining respective cluster shifts for a strand comprising the road link and at least one other connected road link; and detecting the lane closure, a lane shift, or a combination thereof for the strand based on the respective cluster shifts across the strand;

processing the respective cluster shifts using at least one Hidden Markov Model to detect the lane closure, the lane shift, or a combination thereof across the strand; and providing the detected lane closure as an output.

15. The non-transitory computer-readable storage medium of claim 14, wherein the at least one Hidden Markov Model includes a first Hidden Markov Model for lane closure detection and a second Hidden Markov Model for lane shift detection.

* * * * *